United States Patent
Elshafie et al.

(10) Patent No.: US 12,464,528 B2
(45) Date of Patent: Nov. 4, 2025

(54) CONFIGURATION OF COMMUNICATION STATES FOR BANDWIDTH PARTS

(71) Applicant: QUALCOMM Incorporated, San Diego, CA (US)

(72) Inventors: Ahmed Elshafie, San Diego, CA (US); Ahmed Attia Abotabl, San Diego, CA (US); Hung Dinh Ly, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 728 days.

(21) Appl. No.: 17/805,205

(22) Filed: Jun. 2, 2022

(65) Prior Publication Data
US 2023/0397212 A1    Dec. 7, 2023

(51) Int. Cl.
*H04W 72/02* (2009.01)
*H04L 5/00* (2006.01)
*H04L 41/0806* (2022.01)
*H04W 72/21* (2023.01)

(52) U.S. Cl.
CPC .......... *H04W 72/21* (2023.01); *H04L 5/0048* (2013.01); *H04L 41/0806* (2013.01)

(58) Field of Classification Search
CPC . H04W 72/02; H04W 72/04; H04W 72/0446; H04W 72/121; H04W 72/23; H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

| | | | |
|---|---|---|---|
| 2021/0367744 A1* | 11/2021 | Wu | H04W 52/0229 |
| 2025/0016744 A1* | 1/2025 | Zhang | H04L 5/14 |
| 2025/0063564 A1* | 2/2025 | Ouchi | H04W 72/1268 |

* cited by examiner

*Primary Examiner* — Bo Hui A Zhu
(74) *Attorney, Agent, or Firm* — Arent Fox, LLP

(57) ABSTRACT

The present disclosure provides systems, methods, and apparatuses, including computer programs encoded on computer storage media, directed to configuration of communication states for bandwidth parts (BWPs) in which a network node may communicate with a user equipment (UE). Such communication states may be implemented to conserve power and serve cell traffic. In some aspects, an apparatus may be configured to obtain an indication associated with configuring a first set of BWPs from a network node, each of the first set of BWPs corresponding to a first communication state of a set of communication states for the network node. The apparatus may be further configured to communicate with the network node on a set of resources in one of the first set of BWPs, the set of resources being associated with the first communication state of the set of communication states.

26 Claims, 11 Drawing Sheets

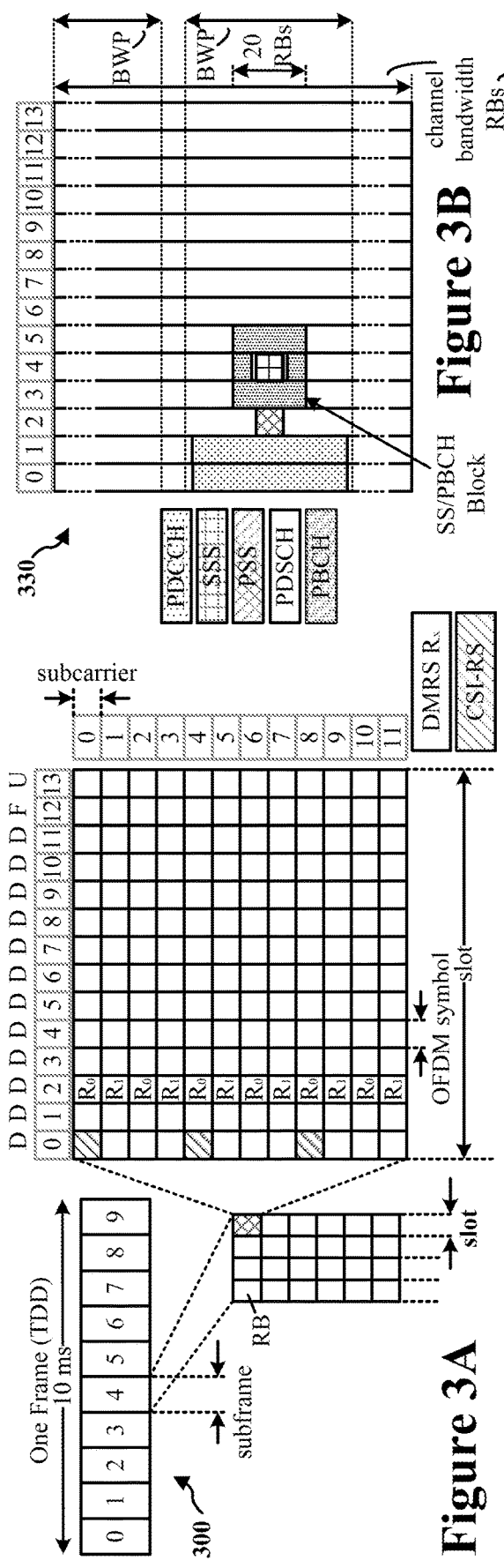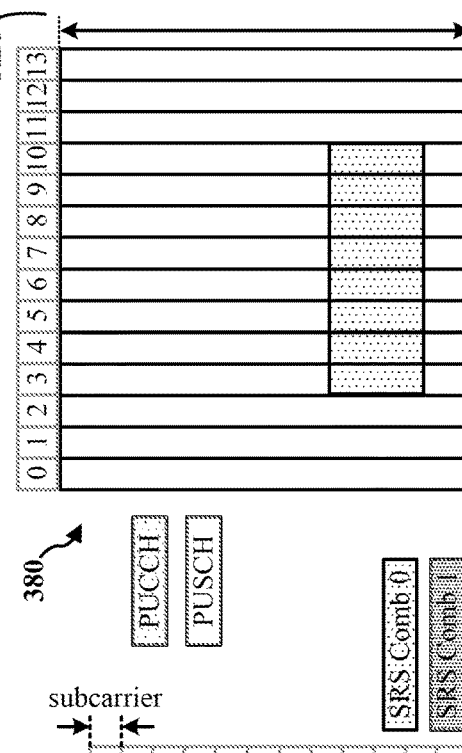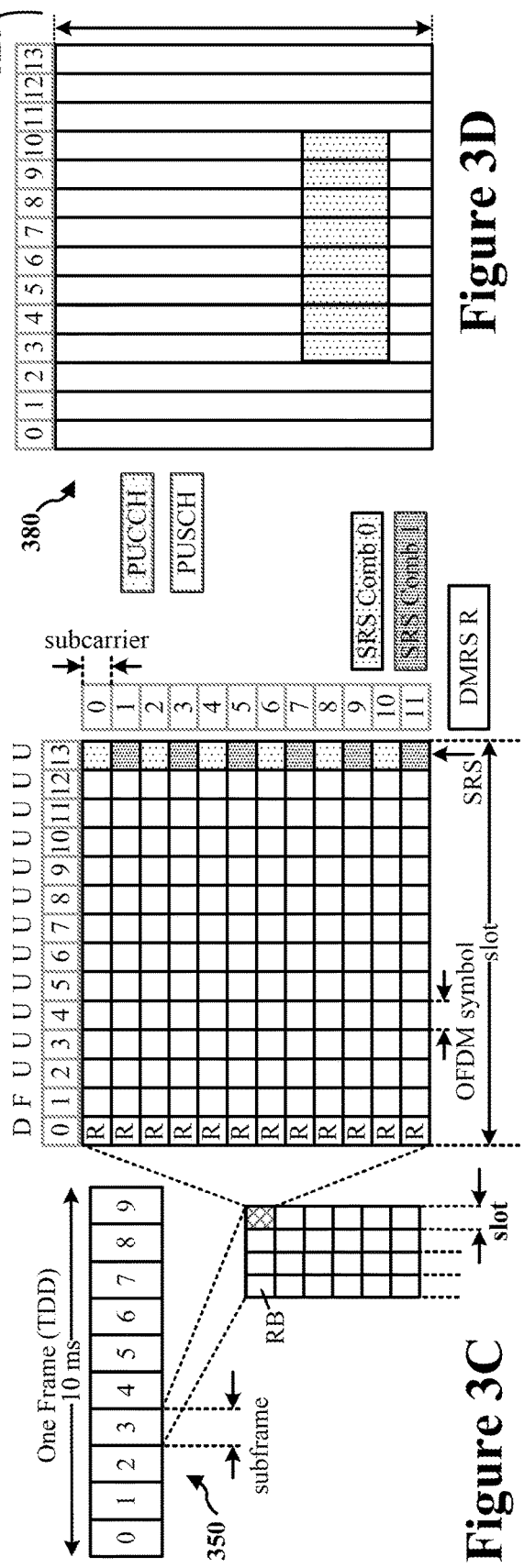
Figure 3B
Figure 3D
Figure 3A
Figure 3C

CONFIGURATION OF COMMUNICATION STATES FOR BANDWIDTH PARTS

TECHNICAL FIELD

The present disclosure generally relates to communication systems, and more particularly, to configuration of communication states for bandwidth parts in which to communicate in an access or other wireless network.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with the Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The systems, methods, and devices of this disclosure each have several innovative aspects, no single one of which is solely responsible for the desirable attributes disclosed herein.

One innovative aspect of the subject matter described in this disclosure can be implemented in an apparatus. The apparatus can be a user equipment (UE) or a component thereof. The apparatus includes a processing system and a transceiver. The processing system is configured to receive an indication associated with configuring a first set of bandwidth parts (BWPs) from a network node, with each of the set of BWPs corresponding to a first communication state of a set of communication states for the network node. The transceiver is configured to communicate with the network node on a set of resources in one of the first set of BWPs, with the set of resources being associated with the first communication state.

In some implementations, to communicate with the network node on the set of resources, the transceiver is configured to at least one of: receive a set of channel state information (CSI) reference signals (RSs) (CSI-RSs) from the network node on the set of resources associated with the first communication state, transmit a set of SRSs on the set of resources associated with the first communication state, or transmit uplink control information (UCI) on the set of resources associated with the first communication state and the set of resources includes a physical uplink control channel (PUCCH).

In some implementations, the transceiver is further configured to receive information configuring a second set of BWPs from the network node, with each of the second set of BWPs corresponding to a second communication state of the set of communication states. The processing system is further configured to locate the one of the first set of BWPs from one of the second set of BWPs.

In some implementations, the one of the first set of BWPs is at least one of: offset from a center frequency of the one of the second set of BWPs, at least partially overlaps with the one of the second set of BWPs, or spans a smaller range than the one of the second set of BWPs.

Another innovative aspect of the subject matter described in this disclosure can be implemented in another apparatus. The other apparatus can be a network node or a component thereof. The other apparatus includes a processing system and a first interface. The processing system of the other apparatus is configured to define each of the first set of BWPs corresponding to a first communication state of a set of communication states for the network node. The first interface of the other apparatus is further configured to output information identifying each of the first set of BWPs.

In some implementations, the processing system of the other apparatus is further configured to schedule communication with a UE on a set of resources in one of the first set of BWPs, and the set of resources is associated with the first communication state of the set of communications states.

In some implementations, the processing system of the other apparatus is further configured to define each of a second set of BWPs corresponding to a second communication state of the set of communication states, and each of the first set of BWPs is locatable from a respective one of the second set of BWPs, and the first interface of the other apparatus is further configured to output information identifying each of the second set of BWPs.

Another innovative aspect of the subject matter described in this disclosure can include a method implemented at an apparatus. The method includes receiving an indication associated with configuring a first set of BWPs from a network node, with each of the set of BWPs corresponding to a first communication state of a set of communication states for the network node. The method further includes communicating with the network node on a set of resources in one of the first set of BWPs, with the set of resources being associated with the first communication state.

Another innovative aspect of the subject matter described in this disclosure can include another other method implemented at another apparatus. The other method includes defining each of a first set of BWPs corresponding to a first communication state of a set of communication states for the other apparatus. The other method further includes outputting information identifying each of the first set of BWPs.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 3A shows a diagram of an example of a first frame.

FIG. 3B shows a diagram of an example of downlink channels within a subframe.

FIG. 3C shows a diagram of an example of a second frame.

FIG. 3D shows a diagram of an example of uplink channels within a subframe.

Like reference numbers and designations in the various drawings indicate like elements.

DETAILED DESCRIPTION

Figure 1:
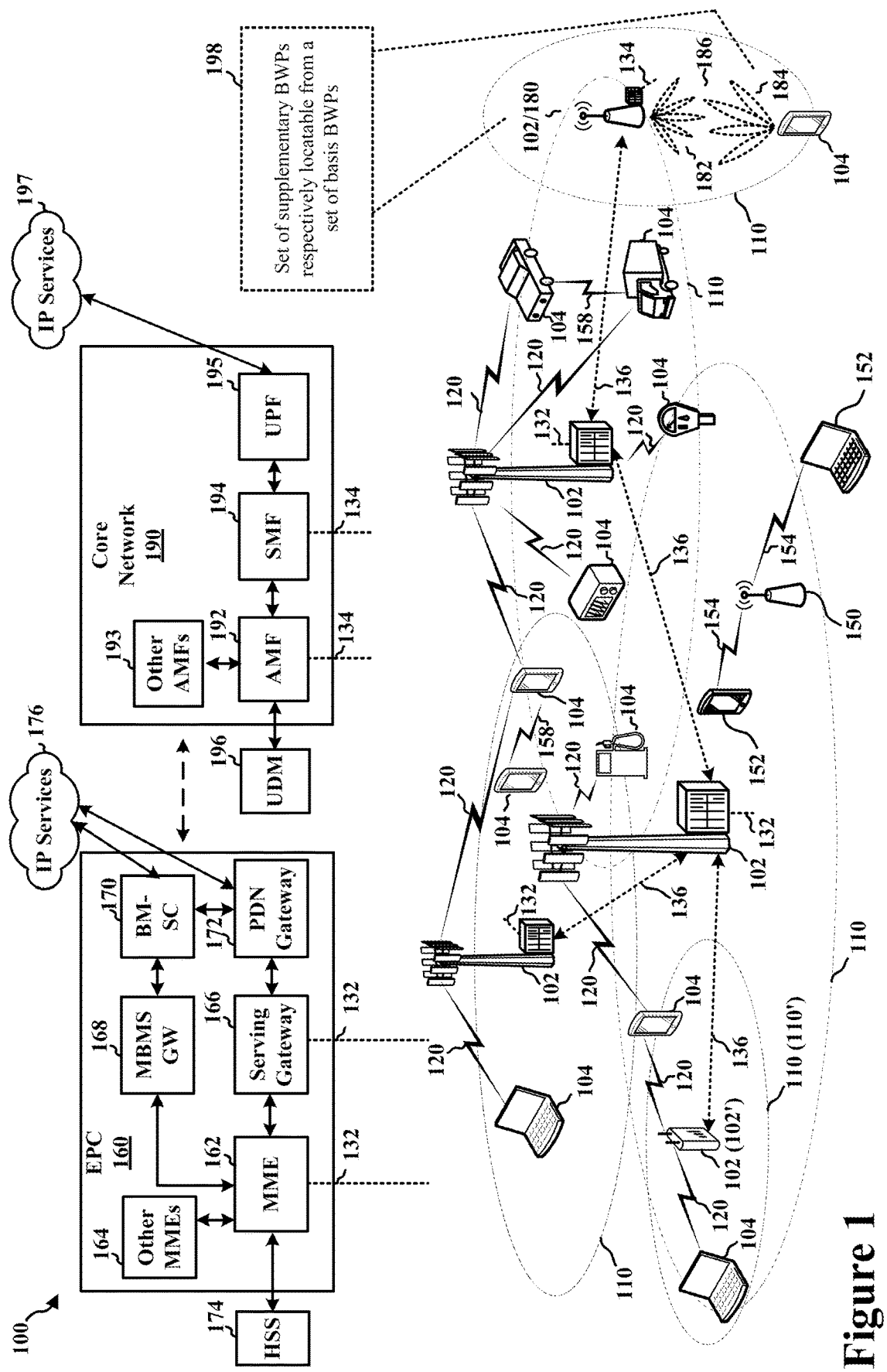
FIG. 1 shows a diagram of an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency (RF) signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), LTE-Advanced (LTE-A), LTE in Unlicensed spectrum (LTE-U), License Assisted Access (LAA), New Radio (NR), or other known signals that are used to communicate within a wireless, cellular, or Internet of Things (IoT) network, such as a system utilizing 3G, 4G, or 5G, or further implementations thereof, technology.

The present disclosure relates to configuration of bandwidth parts (BWPs) with one or more associated communication states for communication between a network node and a user equipment (UE). A BWP may be a set of contiguous physical resource blocks (PRBs) selected from a contiguous subset of common resource blocks for a given numerology on a given carrier. Communication between a network node and a UE may be limited at any given time to one BWP, and in so doing, some issues with communicating over a whole system bandwidth may be avoided or mitigated. For example, lower complexity devices unable to monitor a whole system bandwidth may be supported in systems using BWPs, the overhead accompanying monitoring a whole system bandwidth may be reduced, and so forth.

In some aspects, a network node is able to configure a UE with multiple BWPs, such as four (4) BWPs. A subset of the configured BWPs may be active for a UE at any given time. For example, one BWP may be activated for a given UE at any given time. The UE may expect to communicate within the activated BWP, and may assume that any signaling outside of the activated BWP is not applicable to the UE.

According to some aspects, a communication state may broadly encompass a configuration to which apparatuses, such as network nodes and UEs, adhere so that communication between the apparatuses in a particular BWP is coordinated. For example, a communication state of an apparatus may include a configuration according to which the apparatus transmits or receives signaling on a set of resources allocated to carry data or control information. As another example, a communication state of another apparatus may include a configuration according to which BWPs are adapted or antennas are activated.

In some aspects, a communication state may be associated with a specific purpose or function, such as overhead mitigation, latency reduction, and the like. For example, a communication state may be associated with power conservation, which may be functionally similar to a power savings mode in which an apparatus may operate for battery conservation in some implementations. Power conservation may be realized for a communication state through a reduction in signaling that an apparatus is scheduled to communicate. For example, in one communication state associated with power conservation, an apparatus may be less frequently scheduled to transmit control information or reference signals (RSs) relative to another communication state, or the apparatus may be scheduled to transmit a reduced amount of control information or RSs relative to the other communication state.

As another example, a communication state may be associated with serving traffic in a cell. In some aspects, one or both of the frequency of transmission or the amount of RSs communicated in a cell may increase in proportion to the amount of traffic in a cell. In some other aspects, one or both of the frequency of transmission or the amount of control information communicated in a cell may increase in proportion to the priority of traffic in the cell (that is, more frequently scheduled or a greater amount of control information may be used to serve a greater amount of higher priority traffic in a cell). Correspondingly, one or both of the frequency of transmission or the amount of RSs or control information may be reduced, for example, when the amount of traffic in a cell falls below a threshold or when no (or relatively little) higher priority traffic is ongoing in the cell.

Different communication states may be realized through different BWP configurations, for example, in order to accommodate differences in the frequency of transmission or the amount of signaling at scheduled periods across such communication states. Signaling between a network node and a UE may occur in the activated (or active) BWP, and therefore, resources may be configured and scheduled at a per BWP level. In some aspects, such BWP-level configuration and scheduling of resources may be applicable to both links between network nodes and UEs, such as those on the Uu interface, and links between UEs, such as sidelink (SL) on the PC5 interface.

In some aspects, a network node may configure a UE with a number of BWPs, having respective configurations for respective communication states. For example, a network node may configure a UE with a set of basis BWPs and the set of basis BWPs may each be associated with a respective first configuration of a first communication state. In some aspects, the first communication state may be a "default" or "reference" communication state, such as a communication state in which no constraints or conditions are imposed upon communication between the network node and the UE. The network node may assign a respective first configuration, which likewise may be a default or reference configuration, to each of the set of basis BWPs.

In some aspects, each first configuration may indicate at least one schedule of at least one set of resources allocated in a respective BWP to carry some signaling between the network node or the UE. For example, each first configuration may indicate one or more of a schedule for communicating a set of channel-state information (CSI) reference signals (RSs) (CSI-RSs) in a respective BWP, a schedule for communicating a set of sounding reference signals (SRSs) in a respective BWP, or a schedule for communicating uplink control information (UCI) on a physical uplink control channel (PUCCH) in a respective BWP.

In some aspects, a network node may further configure a UE with another set of BWPs that may be respectively associated with the set of basis BWPs. For example, the network node may configure the UE with a set of supplementary BWPs, each of which may be locatable from a respective one of the set of basis BWPs. For example, one of the supplementary BWPs may be within a corresponding one of the basis BWPs (such as a frequency subrange encompassed by the frequency range of a basis BWP), another supplementary BWP may have a center frequency (that is, the carrier frequency) that is offset from the center frequency (that is, the carrier frequency) of a corresponding one of the basis BWPs by a certain number of subcarriers, and so forth.

A network node may configure each of the supplementary BWPs with a respective supplementary communication state. In some aspects, a supplementary communication state may be associated with a supplementary BWP configuration that is configured for a supplementary BWP. A supplementary communication state may include scheduling or resource allocation for some control information or RSs differently than a communication state of a basis BWP. For example, a network node may configure a supplementary communication state for a supplementary BWP to include fewer resources allocated for control information or RSs than a communication state of a basis BWP. Accordingly, when the network node activates the supplementary BWP for a UE, the UE will monitor and decode fewer resources than when the network node activates a basis BWP corresponding to the supplementary BWP for the UE.

According to various aspects of the present disclosure, power consumption by network nodes and UEs may be reduced, and further, spectrum usage of a systemwide bandwidth may be attenuated. In particular, the present disclosure provides for techniques and approaches to configuring a set of supplementary BWP configurations for a set of supplementary BWPs respectively locatable from a set of basis BWPs. The set of supplementary BWP configurations may include at least one of a schedule or a resource allocation for a supplementary BWP that is different from a schedule or resource allocation of a BWP configuration for a basis BWP from which the supplementary BWP is locatable.

Particular implementations of the subject matter described in this disclosure can be implemented to realize one or more of the following potential advantages. For example, some implementations described herein can be implemented to effect or promote power conservation, frequency spectrum usage efficiency, interference mitigation, or another characteristic that results at least in part from one or more implementations of the subject matter described herein.

Some implementations may effect or promote a potential advantage of reducing the amount of power consumed by a UE when transmitting SRSs to sound a channel for a network node. For example, a network node may activate a supplementary BWP for a UE, and the supplementary BWP may be associated with a supplementary BWP configuration in which fewer resources may be allocated to SRS transmission by the UE than in a BWP configuration of a basis BWP from which the supplementary BWP is locatable. Thus, the UE may transmit fewer SRSs when the supplementary BWP is activated relative to when the basis BWP is activated, and the UE may consume less power by transmitting fewer SRSs. Such a reduction in power consumption may extend the battery life of a UE or reduce the costs commensurate with operating the UE.

Some implementations may effect or promote a potential advantage of reducing the amount of power consumed by a UE when transmitting UCI to a network node on a PUCCH. For example, a network node may activate a supplementary BWP for a UE, and the supplementary BWP may be associated with a supplementary BWP configuration in which fewer resources are allocated to the PUCCH on which the UE transmits UCI than in a BWP configuration of a basis BWP from which the supplementary BWP is locatable. Thus, the UE may transmit less UCI on the PUCCH when the supplementary BWP is activated relative to when the basis BWP is activated, and the UE may consume less power by transmitting less UCI on the allocated resources. Such a reduction in power consumption may extend the battery life of a UE or reduce the costs commensurate with operating the UE.

Some implementations may effect or promote a potential advantage of reducing the amount of power consumed by a UE when receiving CSI-RSs from a network node for channel quality measurements. For example, a network node may activate a supplementary BWP for a UE, and the supplementary BWP may be associated with a supplementary BWP configuration in which fewer resources are allocated to CSI-RSs than in a BWP configuration of a basis BWP from which the supplementary BWP is locatable. Thus, the UE may receive fewer CSI-RSs when the supplementary BWP is activated relative to when the basis BWP is activated, and the UE may consume less power by receiving fewer CSI-RSs in the supplementary BWP than in the basis BWP. Such a reduction in power consumption may extend the battery life of a UE or reduce the costs commensurate with operating the UE.

Some implementations may effect or promote a potential advantage of reducing the amount of power consumed by a network node when receiving SRSs to sound a channel from a UE. For example, the network node may activate a supplementary BWP for a UE, and the supplementary BWP may be associated with a supplementary BWP configuration in which fewer resources are allocated to sounding the channel with SRSs received from the UE than in a BWP configuration of a basis BWP from which the supplementary BWP is locatable. Thus, the network node may receive fewer SRSs when the supplementary BWP is activated for the UE relative to when the basis BWP is activated, and the network node may consume less power by receiving fewer SRSs, such as by switching off or powering down a subset of a set of antennas of the network node.

Some implementations may effect or promote a potential advantage of reducing the amount of power consumed by a network node when receiving UCI on a PUCCH from a UE. For example, a network node may activate a supplementary BWP for a UE, and the supplementary BWP may be associated with a supplementary BWP configuration in which fewer resources are allocated to the PUCCH on which the network node receives UCI from the UE than in a BWP configuration of a basis BWP from which the supplementary BWP is locatable. Thus, the network node may receive less UCI on the PUCCH when the supplementary BWP is activated relative to when the basis BWP is activated, and the network node may consume less power by receiving less UCI, such as by switching off or powering down a subset of a set of antennas of the network node.

Some implementations may effect or promote a potential advantage of reducing the amount of power consumed by a network node when transmitting CSI-RSs to a UE for channel quality measurements. For example, a network node may activate a supplementary BWP for a UE, and the supplementary BWP may be associated with a supplementary BWP configuration in which fewer resources are allocated to CSI-RSs than in a BWP configuration of a basis BWP from which the supplementary BWP is locatable. Thus, the network node may transmit fewer CSI-RSs when the supplementary BWP is activated relative to when the basis BWP is activated, and the network node may consume less power by transmitting fewer CSI-RSs, such as by switching off or powering down a subset of a set of antennas of the network node.

Some implementations may effect or promote a potential advantage of attenuating spectrum usage of a systemwide bandwidth. For example, a network node may activate, for a UE, a supplementary BWP that spans fewer PRBs (in the frequency domain) than a basis BWP. The network node and the UE may communicate in the activated supplementary BWP, and therefore, the remaining PRBs of the basis BWP may be unoccupied by such communication. Such remaining PRBs may then be available as a BWP for communication between the network node and another UE, or such remaining PRBs may remain unoccupied in order to mitigate interference to a neighboring cell or sidelink communication. Additionally or alternatively, the activation of a supplementary BWP so that the network node and the UE communicate on fewer PRBs may enable the network node to communicate with lower complexity UEs that lack the capability to monitor and decode PRBs over a systemwide bandwidth or even over wider-band BWPs. Furthermore, even for UEs having the capability to monitor and decode PRBs over a whole system bandwidth, activation of a supplementary BWP for such UEs may lessen processor loads so that such UEs may dedicate processor cycles to other tasks, which may result in some performance improvements.

FIG. 1 shows a diagram of an example of a wireless communications system and an access network 100. The wireless communications system (also referred to as a wireless wide area network (WWAN)) includes network nodes 102, UEs 104, an Evolved Packet Core (EPC) 160, and another core network 190 (such as a 5G Core (5GC)). The network nodes 102 may include macrocells (such as high power cellular base stations) or small cells (such as low power cellular base stations) or other network entities. The network nodes 102 of some or all of the macrocells can include base stations. The network nodes 102 of some or all of the small cells can include femtocells, picocells, and microcells.

The network nodes 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (such as an S1 interface). The network nodes 102 configured for 5G NR, which may be collectively referred to as Next Generation radio access network (RAN) (NG-RAN), may interface with core network 190 through second backhaul links 134. In addition to other functions, the network nodes 102 may perform one or more of the following functions: transfer of user data, radio channel ciphering and deciphering, integrity protection, header compression, mobility control functions (such as handover or dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the network nodes 102 may communicate directly or indirectly (such as through the EPC 160 or core network 190) with each other over third backhaul links 136 (such as an X2 interface). Some or all of the first backhaul links 132, the second backhaul links 134, or the third backhaul links 136 may be wired, wireless, or some combination thereof. While each of the network nodes 102 may be illustrated as a single system or device, one having ordinary skill in the relevant art will readily appreciate that the various concepts and aspects described herein may be implemented in a disaggregated RAN, including RAN architectures such an open RAN (O-RAN) or virtualized RAN (vRAN). For example, as described in the context of FIG. 2, each of the network nodes 102 may be implemented as a monolithic network node (such as a standalone base station) or a disaggregated network node.

The network nodes 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the network nodes 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro base stations (such as one or more of the network nodes 102). A network that includes both small cell and macrocells may be known as a heterogeneous network. A heterogeneous network may also include Home Evolved Node Bs (eNBs) (HeNBs), which may provide service to a restricted group known as a closed subscriber group (CSG).

The communication links 120 between the network nodes 102 and the UEs 104 may include uplink (also referred to as reverse link) transmissions from a UE 104 to a network node 102 or downlink (also referred to as forward link) transmissions from a network node 102 to a UE 104. The communication links 120 may use multiple-input and multiple-output (MIMO) antenna technology, including spatial multiplexing, beamforming, or transmit diversity. Wireless links or radio links may be on one or more carriers, or component carriers (CCs). The network nodes 102 or UEs 104 may use spectrum up to Y megahertz (MHz) (in some examples, Y may be equal to or approximately equal to 5, 10, 15, 20, 100, 400, and so forth) bandwidth per carrier allocated in a carrier aggregation of up to a total of Yx MHz (such as x CCs) used for transmission in each direction. The CCs may or may not be adjacent to each other. Allocation of CCs may be asymmetric with respect to downlink and uplink (in various examples, more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a network node (such as a gNB or other base station) at the access network level and to at least one core network node (such as the AMF or MME) at the core network level, and the UE may be configured to receive downlink control information in the access network (such as where the UE is in a radio resource control (RRC) Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, such as in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same unlicensed frequency spectrum (such as 5 GHz or the like) as used by the Wi-Fi AP 150. The small cell 102', employing NR in an unlicensed frequency spectrum, may boost coverage to or increase capacity of the access network.

The electromagnetic spectrum is often subdivided, based on frequency/wavelength, into various classes, bands, channels, and so forth. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, or frequencies that may be within the EHF band.

A network node 102, whether a small cell 102' or a large cell (such as a macro base station), may include or may be referred to as an eNB, gNodeB (gNB), another type of base station, or another type of network node that communicates over the air interface or provides a link to the EPC 160 or the core network 190. Some network nodes 180, such as gNBs, may operate in a traditional sub 6 GHz spectrum, in mmW frequencies, or near-mmW frequencies in communication with the UE 104. When such a network node 180 (such as a gNB) operates in mmW or near-mmW frequencies, the network node 180 may include a mmW network node, such as a mmW base station. The (mmW) network node 180 may utilize beamforming 186 with the UE 104 to compensate for the path loss and short range. The network node 180 and the UE 104 may each include a plurality of antennas, such as antenna elements, antenna panels, or antenna arrays to facilitate the beamforming.

The network node 180 may transmit a beamformed signal to the UE 104 via one or more transmit (TX) beams of the beams 182 (that is, in one or more beamformed TX directions). The UE 104 may receive the beamformed signal from the network node 180 via one or more receive (RX) beams of the beams 184 (that is, in one or more beamformed RX directions). The UE 104 may also transmit a beamformed signal to the network node 180 via one or more TX beams of the beams 184 (that is, in one or more beamformed TX directions). The network node 180 may receive the beamformed signal from the UE 104 via one or more RX beams of the beams 182 (that is, in one or more beamformed RX directions). One or both of the network node 180 or the UE 104 may perform beam training or beam refinement to select, identify, or otherwise determine the "best" TX or RX beam(s) of the beams 182 or the "best" RX or TX beam(s) of the beams 184, respectively, which may correspond to beamformed directions on which the highest signal strength or channel quality is detected for the one or both of the network node 180 or UE 104. The TX and RX directions for the network node 180 may or may not be the same; that is, the network node 180 may select, identify, or otherwise determine the "best" TX beam(s) of the beams 182 for transmission, which may be different from the RX beam(s) of the beams 182 that the network node 180 selects, identifies, or otherwise determines is "best" for reception. Similarly, the TX and RX directions for the UE 104 may or may not be the same; that is, the UE 104 may select, identify, or otherwise determine the "best" RX beam(s) of the beams 184 for reception, which may be different from the TX beam(s) of the beams 184 that the UE 104 selects, identifies, or otherwise determines is "best" for transmission.

In various different aspects, one or more of the network nodes 102/180 may include or may be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology.

In some aspects, one or more of the network nodes 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions.

The PDN Gateway 172 and the BM-SC 170 are connected to the IP Services 176. The IP Services 176 may include the Internet, an intranet, an IP Multimedia Subsystem (IMS), a Packet Switch (PS) Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the network nodes 102 belonging to a Multicast Broadcast Single Frequency Network (MBSFN) area broadcasting a particular service, and may be responsible for session management (start/stop) and for collecting eMBMS related charging information.

In some other aspects, one or more of the network nodes 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, or other IP services.

In certain aspects, a network node 102/180 may be configured to define each of a set of supplementary BWPs 198, which may be respectively locatable from a set of basis BWPs. The network node 102/180 may also define the set of basis BWPs. Illustratively, each of the set of supplementary BWPs may be at least one of offset from a center frequency of a respective one of the set of basis BWPs, at least partially overlapping with a respective one of the set of basis BWPs, or spanning a smaller frequency range than a respective one of the set of basis BWPs. Each of the set of basis BWPs may be associated with a respective basis BWP configuration corresponding to a first communication state (such as a first power state, a default power state, or another communication state). Similarly, each of the set of supplementary BWPs may be associated with a respective supplementary BWP configuration corresponding to a second communication state (such as a second power state, a power saving state, or another communication state).

The network node 102/180 may be configured to output information identifying each of the set of basis BWPs. Such information identifying each of the set of basis BWPs may be transmitted to the UE 104. The network node 102/180 may be further configured to output information identifying each of the set of supplementary BWPs 198. Such information identifying each of the set of supplementary BWPs 198 may also be transmitted to the UE 104.

In certain other aspects, the UE 104 may be configured to receive, from the network node 102/180, an indication associated with configuring the set of supplementary BWPs 198 from the set of basis BWPs, with each of the set of supplementary BWPs 198 corresponding to the second communication state of the set of communication states for the network node 102/180. The UE 104 may be further configured to communicate with the network node 102/180 on the set of resources in one of the set of supplementary BWPs 198, with the set of resources being associated with the second communication state of the set of communication states.

Additional or other concepts and aspects related to adaptive beamforming using a subset of a set of beams are further described herein. Although the present disclosure may focus on 5G NR, the concepts and various aspects described herein may be applicable to other similar areas, such as LTE, LTE-A, LTE-U, LAA, CDMA, GSM, or other wireless/radio access technologies.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS), or one or more units (or one or more components) performing base station functionality, may be implemented in an aggregated or disaggregated architecture. For example, a BS (such as a Node B (NB), eNB, NR BS, 5G NB, gNB, AP, a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a vRAN (also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
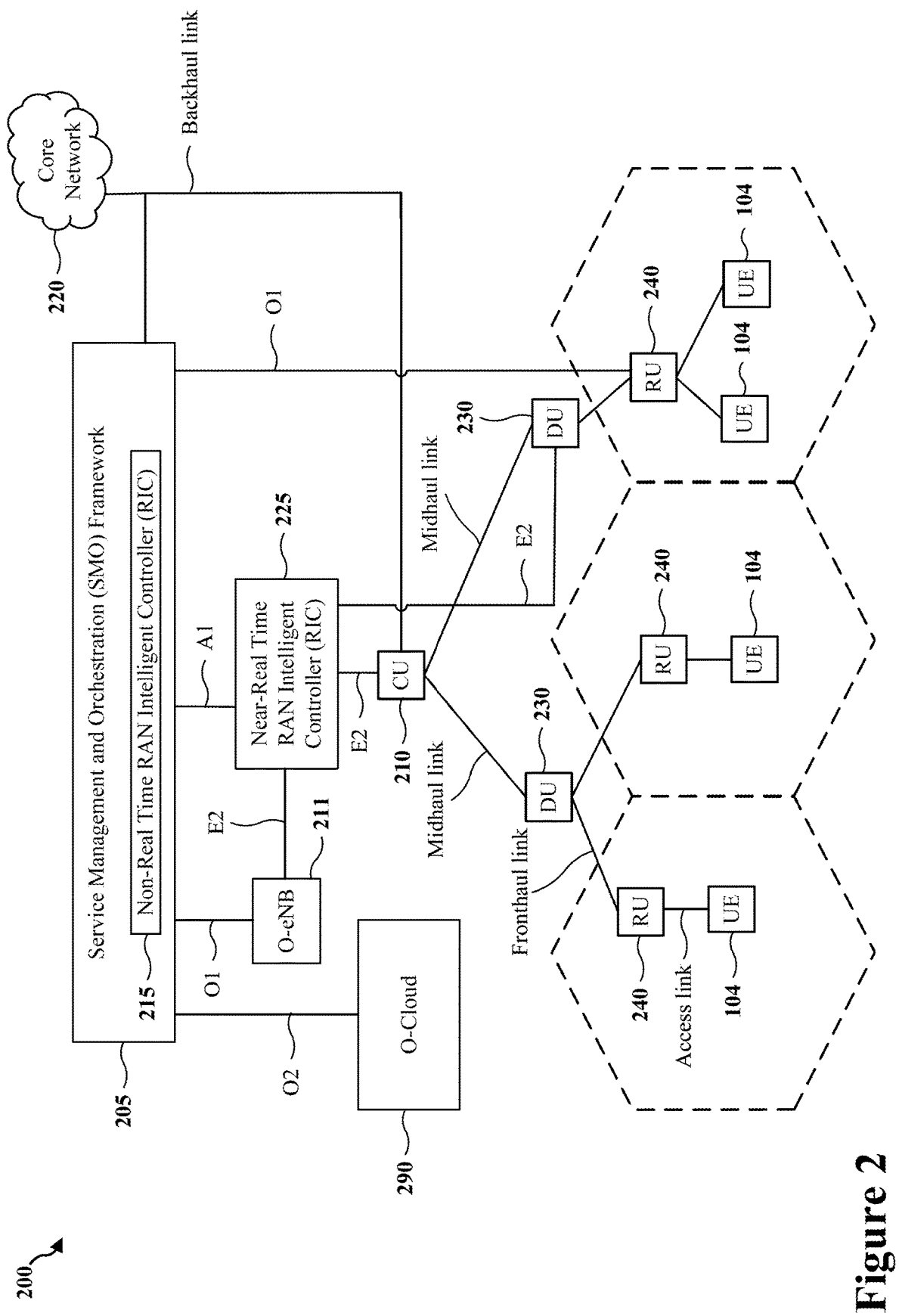
FIG. 2 shows a diagram illustrating an example disaggregated base station architecture.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more RUs 240 via respective fronthaul links. The RUs 240 may communicate with respective UEs 104 via one or more RF access links. In some implementations, the UE 104 may be simultaneously served by multiple RUs 240.

Each of the units—that is, the CUs 210, the DUs 230, the RUs 240, as well as the Near-RT RICs 225, the Non-RT RICs 215, and the SMO Framework 205—may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 210 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (such as on a Central Unit-User Plane (CU-UP)), control plane functionality (such as on a Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

FIG. 3A is a diagram illustrating an example of a first subframe 300 within a 5G NR frame structure. FIG. 3B is a diagram illustrating an example of downlink channels within a 5G NR subframe 330. FIG. 3C is a diagram illustrating an example of a second subframe 350 within a 5G NR frame structure. FIG. 3D is a diagram illustrating an example of uplink channels within a 5G NR subframe 380. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 3A, 3C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description provided herein may also apply to a 5G NR frame structure that is TDD.

Other wireless communication technologies may have a different frame structure or different channels. A frame, which may be of 10 ms, may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is associated with the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing.

FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different BWPs (see FIG. 3B) that are frequency division multiplexed. Each BWP may have a particular numerology.

A resource grid may be used to represent the frame structure. Each time slot includes a resource block (RB) (also referred to as PRBs) that extends 12 consecutive subcarriers. The resource grid is divided into multiple resource elements (REs). The number of bits carried by each RE depends on the modulation scheme.

As illustrated in FIG. 3A, some of the REs carry at least one pilot signal, such as an RS, for the UE. Broadly, RSs may be used for beam training and management, tracking and positioning, channel estimation, or other such purposes. In some configurations, an RS may include at least one demodulation RS (DM-RS) (indicated as Rx for one particular configuration, where 100x is the port number, but other DM-RS configurations are possible) or at least one channel state information (CSI) RS (CSI-RS) for channel estimation at the UE. In some other configurations, an RS may additionally or alternatively include at least one beam measurement (or management) RS (BRS), at least one beam refinement RS (BRRS), or at least one phase tracking RS (PT-RS).

FIG. 3B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater or lower frequencies across the channel bandwidth.

A primary synchronization signal (PSS) may be within symbol 2 of particular subframes of a frame. A UE (such as a UE 104 shown in FIGS. 1 and 2) uses the PSS to acquire, synchronize, or otherwise determine subframe/symbol timing and a physical layer identity. A secondary synchronization signal (SSS) may be within symbol 4 of particular subframes of a frame. A UE (such as a UE 104 shown in FIGS. 1 and 2) to find, identify, or otherwise determine a physical layer cell identity group number and radio frame timing. Associated with the physical layer identity and the physical layer cell identity group number, the UE can identify, calculate, or otherwise determine a physical cell identifier (PCI). Associated with the PCI, the UE can find, locate, calculate, or otherwise determine the locations of the aforementioned DM-RS.

The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used.

The UE may transmit SRS. The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 3D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), or UCI.

Figure 4:
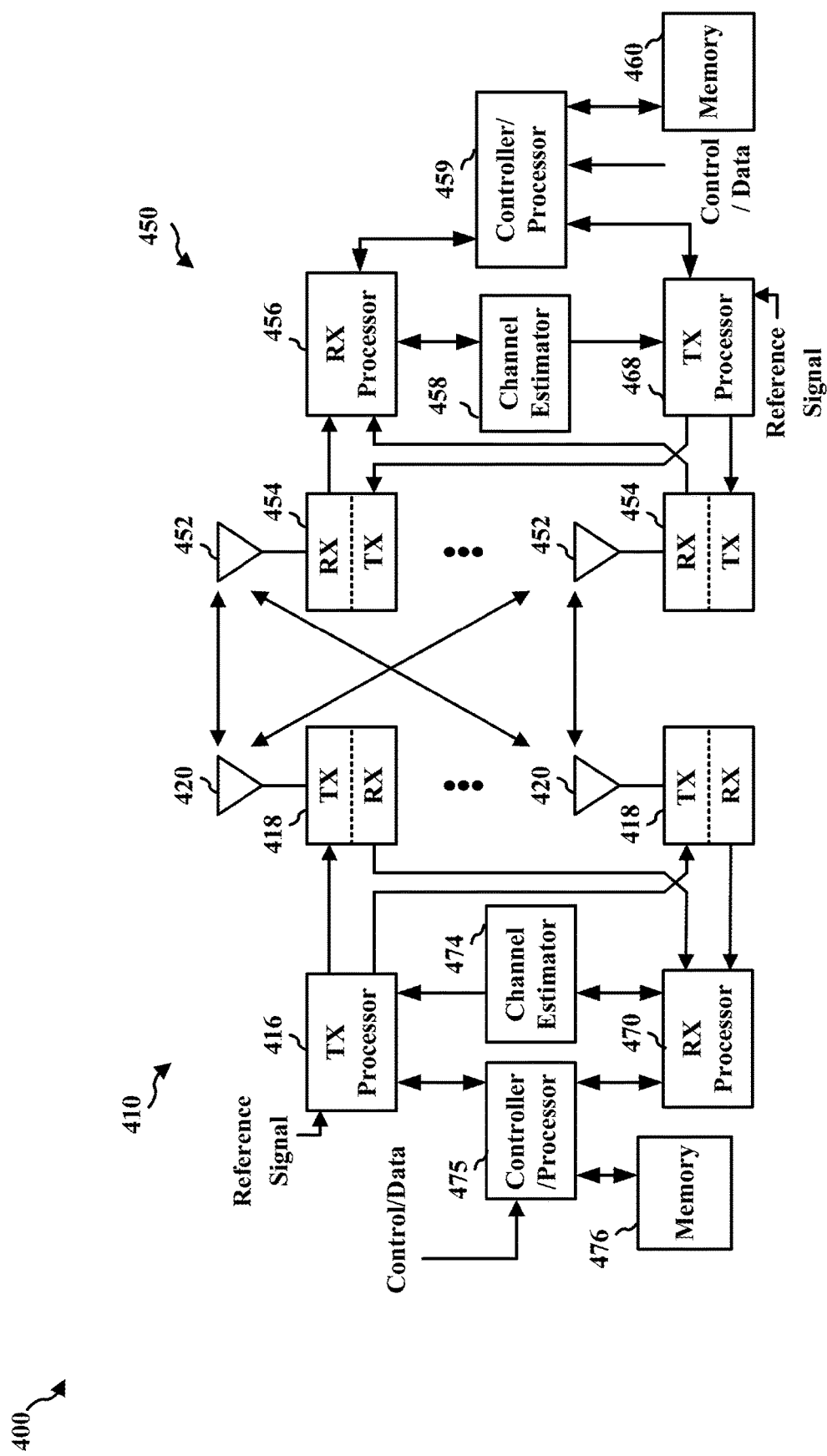
FIG. 4 shows a diagram of an example of a network node and user equipment (UE) in an access network.

FIG. 4 shows a diagram of an example of a network node 410 and UE 450 in an access network 400. In some aspects, the network node 410 can be an example of a network node 102/180 depicted in FIG. 1 and described in the context thereof. In some other aspects, the network node 410 can be an example of one or more of a CU 210, a DU 230, an RU 240, or any combination thereof, as depicted in FIG. 2 and described in the context thereof.

In the downlink, IP packets from the EPC 160 may be provided to a controller/processor 475. The controller/processor 475 implements Layer 2 (L2) and Layer 4 (L3) functionality. L3 includes an RRC layer, and L2 includes a SDAP layer, a PDCP layer, an RLC layer, and a MAC layer. The controller/processor 475 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement Layer 1 (L1) functionality associated with various signal processing functions. L1, which includes a PHY layer, may include error detection on the transport channels, FEC coding/decoding of the transport channels, interleaving, rate matching, mapping onto physical channels, modulation/demodulation of physical channels, and MIMO antenna processing. The TX processor 416 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, or both, and then combined together using an iFFT to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal or channel condition feedback transmitted by the UE 450. Each spatial stream may then be provided to a different antenna 420 via a separate transmitter 418TX. Each transmitter 418TX may modulate a RF carrier with a respective spatial stream for transmission.

At the UE 450, each receiver 454RX receives a signal through at least one respective antenna 452. Each receiver 454RX recovers information modulated onto an RF carrier and provides the information to the RX processor 456. The TX processor 468 and the RX processor 456 implement L1 functionality associated with various signal processing functions. The RX processor 456 may perform spatial processing on the information to recover any spatial streams destined for the UE 450.

If multiple spatial streams are destined for the UE 450, they may be combined by the RX processor 456 into a single OFDM symbol stream. The RX processor 456 converts the OFDM symbol stream from the time-domain to the frequency domain using a FFT. The frequency domain signal includes a separate OFDM symbol stream for each subcarrier of the OFDM signal. The symbols on each subcarrier, and the reference signal, are recovered and demodulated by estimating, calculating, or otherwise determining the most likely signal constellation points transmitted by the network node 410. These soft decisions may be associated with channel estimates computed by the channel estimator 458. The soft decisions are decoded and deinterleaved to recover the data and control signals that were originally transmitted by the network node 410 on the physical channel. The data and control signals are provided to the controller/processor 459, which implements L3 and L2 functionality.

Similar to the functionality described in connection with the downlink transmission by the network node 410, the controller/processor 459 provides RRC layer functionality associated with system information (such as a MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the network node 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The uplink transmission is processed at the network node 410 in a manner similar to that described in connection with the receiver function at the UE 450. Each receiver 418RX receives a signal through at least one respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the uplink, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK/NACK protocol to support HARQ operations.

In some aspects, at least one of the TX processor 468, the RX processor 456, and the controller/processor 459 may be configured to perform aspects in connection with the set of supplementary BWPs 198 respectively locatable from the set of basis BWPs, as shown in FIG. 1.

In some other aspects, at least one of the TX processor 416, the RX processor 470, and the controller/processor 475 may be configured to perform aspects in connection with the set of supplementary BWPs 198 respectively locatable from the set of basis BWPs, as shown in FIG. 1.

Figure 5:
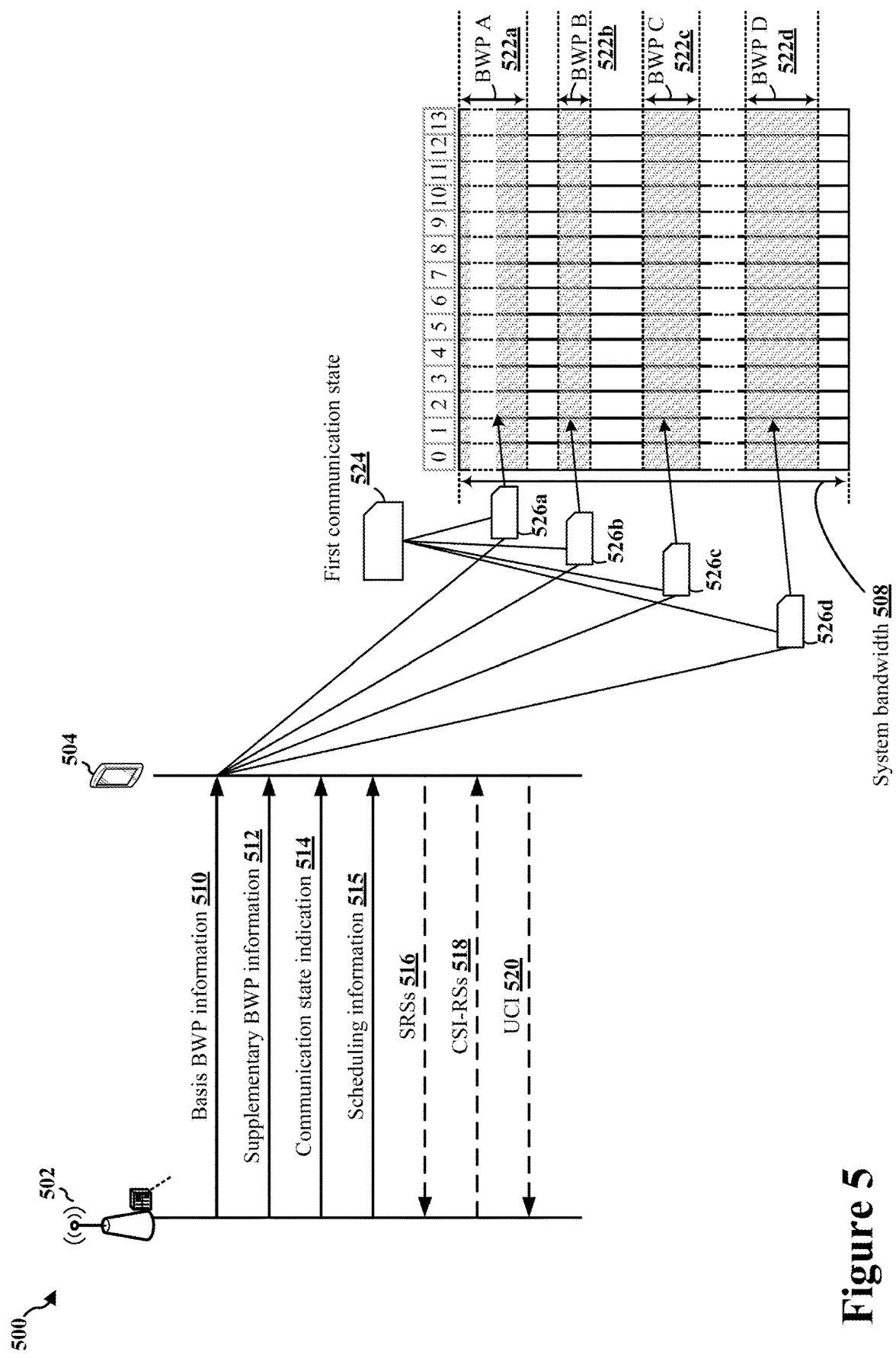
FIG. 5 shows a call flow diagram of an example configuration of one of a set of communication states corresponding to a set of bandwidth parts (BWPs) in which a network node and a UE can communicate.

FIG. 5 shows a call flow diagram of an example configuration 500 of one of a set of communication states corresponding to a set of BWPs in which a network node 502 and a UE 504 can communicate. In some aspects, the network node 502 can be an example of a network node 102/180 and the UE 504 can be an example of a UE 104, as depicted in FIG. 1 and described in the context thereof. In some other aspects, the network node 502 can be an example of one or more of a CU 210, a DU 230, or an RU 240, as depicted in FIG. 2 and described in the context thereof. In still further aspects, the network node 502 can be an example of the network node 410 and the UE 504 can be an example of the UE 450, as depicted in FIG. 4 and described in the context thereof.

A UE 504 may be connected with a network node 502, such as the when the UE 504 is operating in an RRC connected mode with the network node 502. Accordingly, the network node 502 may be configured to communicate some signaling with the UE 504, such as CSI-RSs for channel measurements, SRSs for sounding over the channel, or UCI on a PUCCH. Such communication may occur in an activated BWP, which the network node 502 may configure and activate for the UE 504.

According to various aspects of the present disclosure, the network node 502 may define or configure a set of BWPs A 522a, B 522b, C 522c, D 522d for the UE 504. For example, the network node 502 may configure a set of four (4) BWPs 522a-522d. Each of the set of BWPs may be a set of basis BWP, which may be a BWP from which at least one supplementary BWP is locatable. The network node 502 may output, such as via an interface, basis BWP information 510 indicating the set of basis BWPs 522a-522d. In some aspects, the network node 502 may transmit, to the UE 504, basis BWP information 510 that indicates each of the basis BWP configured for the UE 504. For example, the basis BWP information 510 may indicate a respective set of contiguous PRBs of which each of the basis BWPs is composed.

Each of the basis BWPs A 522a, B 522b, C 522c, D 522d may be associated with a first communication state 524 for the network node 502. The network node 502 may configure a communication state for a basis BWP, for example, by scheduling or allocating at least one of a respective set of resources for each of a set of signals transmitted by the network node 502 to the UE 504 (such as with downlink resources) or a respective set of resources for each of a set of signals received by the network node 502 from the UE 504 (such as with uplink resources). Thus, a communication state may be implemented in a BWP via a BWP configuration.

Illustratively, for the first communication state 524, the network node 502 may define or configure four (4) basis BWP configurations 526a-526d that respectively correspond to the four (4) basis BWPs 522a-522d. The network node 502 may output, such as via an interface, an indication associated with configuring the UE 504 with each of the basis BWPs 522a-522d with a respective one of the basis BWP configurations 526a-526d. For example, the network node 502 may output, such as via an interface, this indication in the basis BWP information 510. The network node 502 may transmit, and the UE 504 may receive, the basis BWP information 510, which may include one or more messages transmitted by the network node 502 and received by the UE 504.

In one aspect, the network node 502 may include, in the basis BWP information 510, an explicit indication for each of the basis BWP configurations 526a-526d. In another aspect, the network node 502 may include, in the basis BWP information 510, an implicit indication for each of the basis BWP configurations 526a-526d. For example, the UE 504 may include some preconfigured information (such as information that is not received via signaling from the network node 502) mapping a BWP to a communication state or to a BWP configuration. When the network node 502 configures the UE 504 with a specific BWP, such as basis BWP A 522a, the UE 504 may access the preconfigured information in memory to identify a BWP configuration 526a that is mapped to by the BWP A 522a. Thus, when the network node 502 configures the UE 504 with the basis BWP A 522a, the UE 504 may apply the BWP configuration 526a corresponding to the BWP A 522a to successfully communicate with the network node 502.

In one example implementation, each of the basis BWP configurations 526a-526d may indicate a respective schedule or allocation of a set of resources on which the network node 502 is to transmit CSI-RSs in a respective one of the basis BWPs 522a-522d to the UE 504. In another example implementation, each of the basis BWP configurations 526a-526d may include a respective schedule or allocation of a set of resources on which the UE 504 is to transmit SRSs in a respective one of the basis BWPs 522a-522d to the network node 502. In some further aspects, the network node 502 may configure a communication state for a basis BWP by scheduling or allocating a set of resources for a PUCCH on which the UE 504 is to transmit UCI in that basis BWP.

In some example implementations, one or more of the BWP configurations 526a-526d may define one or more of a number of antennas to be used (such as a maximum number of transmit antennas) for CSI-RS transmissions, a number of ports allocated for CSI-RS transmissions, a size (such as in resources or RBs) or aggregation level for a PUCCH, a number or level of repetitions for SRS transmission, a number or level of repetitions for transmissions on a PUCCH, or other similar or related parameters. Various other signaling, settings, parameters, and the like associated with communication between a network node and a UE may be included in addition or alternative to one or more of the foregoing without departing from the scope of the present disclosure.

In some aspects, the first communication state 524 may correspond to BWP configurations that are more (or the most) expensive in terms of overhead relative to one or more other BWP configurations to which other communication states correspond, such as a communication state configured for a supplementary BWP. That is, the first communication state 524 may be associated with BWP configurations that include resource allocations of greater amounts or more frequent scheduling relative to some supplementary BWP configurations of different communication states. Correspondingly, BWP configurations of the first communication state 524 may consume a greater amount of power, memory, processor cycles, and so forth than supplementary BWP configurations of different communication states.

Reciprocally, the resource allocations and the scheduling of resources included in the supplementary BWP configurations of another communication state may be involved in at least one of detecting and decoding fewer allocated resources per scheduled interval (such as a frame, a subframe, a slot, and so forth) or detecting and decoding allocated resources across less frequently scheduled intervals. In implementing the foregoing aspects, the network node 502 may consume less power because the network node 502 may transmit or receive fewer signals, thereby consuming fewer processor cycles or allowing the network node 502 to deactivate one or more unused antennas. Similarly, the UE 504 may consume less power because the UE 504 may transmit or receive fewer signals, thereby consuming fewer processor cycles and allowing battery life of the UE 504 to be conserved.

In addition to the basis BWPs 522a-522d with which the network node 502 configures the UE 504 via the basis BWP information 510, the network node 502 may define or configure a set of supplementary BWPs. The network node 502 may output, such as via an interface, supplementary BWP information 512 that indicates a location in the system bandwidth 508 of each of the supplementary BWPs.

Figure 6:
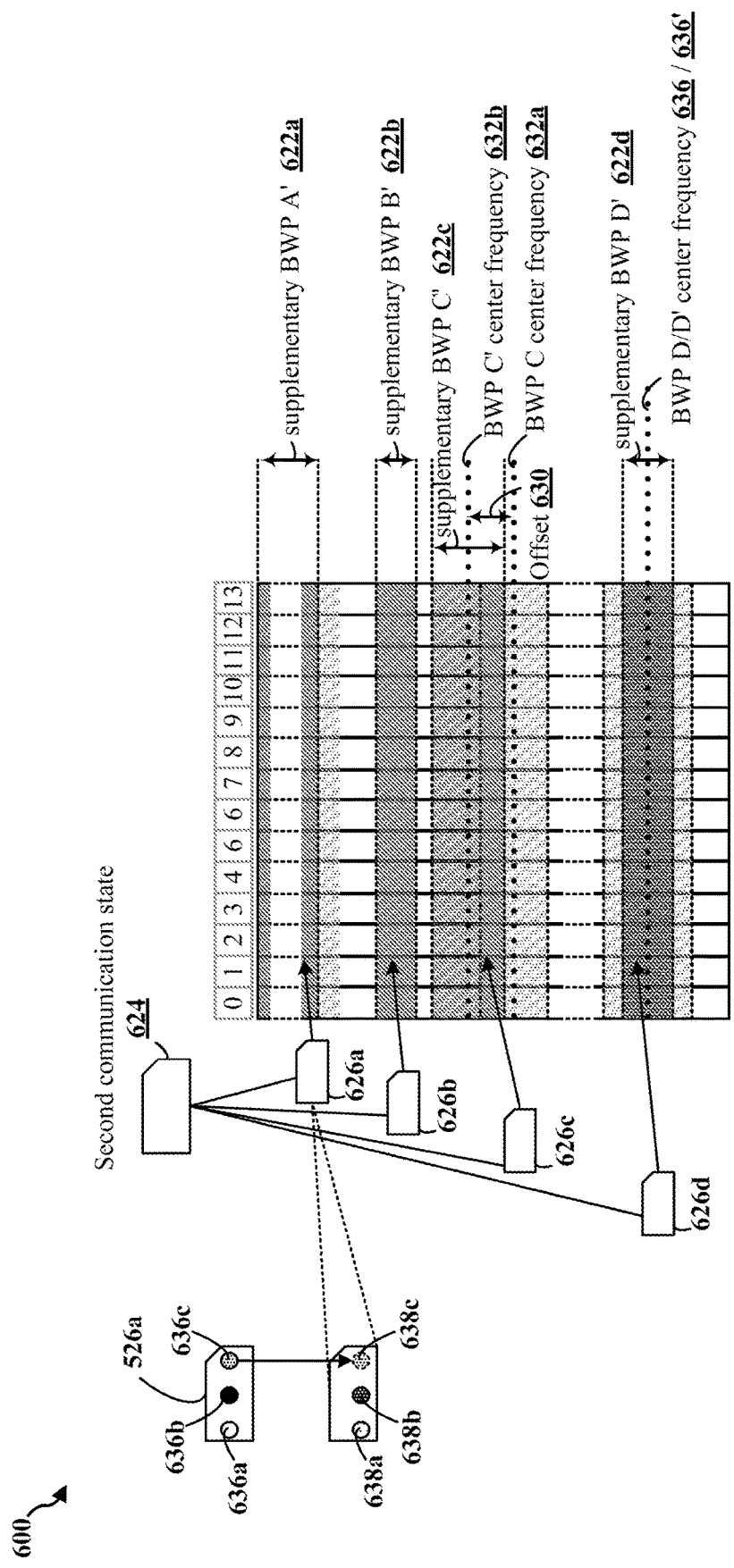
FIG. 6 shows a diagram of an example configuration of supplementary BWPs corresponding to a communication state that is associated with supplementary BWP configurations.

FIG. 6 shows a diagram of an example configuration 600 of supplementary BWPs A' 622a, B' 622b, C' 622c, D' 622d corresponding to a communication state 624 that is associated with supplementary BWP configurations 626a-626d. According to various aspects, each of the supplementary BWPs 622a-622d may be locatable from a respective one of the basis BWPs 522a-522d. For example, supplementary BWP A' 622a may be locatable from basis BWP A 522a, supplementary BWP B' 622b may be locatable from basis BWP B 522b, and so forth. A supplementary BWP may be entirely within a corresponding basis BWP, partially within (that is, overlapping) with a corresponding basis BWP, or entirely separate from (that is, non-overlapping with) a corresponding basis BWP. Further, a supplementary BWP may span a number of subcarriers that is less than, equal to, or greater than a number of subcarriers spanned by a corresponding basis BWP.

In some aspects, a supplementary BWP may be locatable from a basis BWP in that the set of contiguous PRBs in the system bandwidth 508 of which the supplementary BWP is composed may be defined or identified in reference to a corresponding basis BWP. In some examples, a supplementary BWP may be locatable via an offset from a basis BWP, such as a constant or scale factor in a positive or negative direction. In some other examples, a supplementary BWP may be locatable via a function that maps from a basis BWP, such as an additive function or a multiplicative function.

In some aspects, each BWP may include a center frequency (or carrier frequency), which may be a centermost frequency or subcarrier (such as where a BWP spans an odd number of subcarriers) or set of subcarriers (such as two subcarriers where a BWP spans an even number of subcarriers), and the center frequency of a supplementary BWP may be defined in reference to the center frequency of a corresponding basis BWP. For example, a supplementary BWP may be defined by an offset from the center frequency of a basis BWP, or a supplementary BWP may be defined by PRBs disposed on one or both sides of a basis BP.

As one illustration of locating a supplementary BWP via a corresponding basis BWP, supplementary C' 622c may be defined in relation to the corresponding basis BWP C 522c. In illustrated aspect, supplementary BWP C' 622c may be locatable from basis BWP C 522c via an offset 630 that separates the center frequency 632a of basis BWP C 522c from the center frequency 632b of supplementary BWP 622c by a certain number of subcarriers. Thus, in order to locate supplementary BWP C' 622c, the UE 504 may be provided with the offset 630 from the center frequency 632a of basis BWP C 522c (and potentially, the number of subcarriers spanned by supplementary BWP C' 622c).

As another illustration of locating a supplementary BWP via a corresponding basis BWP, supplementary D' 622d may be defined in relation to the corresponding basis BWP D 522d. In illustrated aspect, the center frequency 636' of supplementary BWP D' 622d may be the same as the center frequency 636 of basis BWP D 522d. However, supplementary BWP D' 622d may be mapped to by basis BWP D 522d via a function that reduces the number of subcarriers spanned on either side of the center frequency 636, 636'. Thus, in order to locate supplementary BWP D' 622d, the UE 504 may be provided with the function or one or more coefficients of the function to map basis BWP D 522d to supplementary BWP D' 622d around the same center frequency 636, 636'.

Similar to the basis BWPs 522a-522d, each of the supplementary BWPs 622a-622d may be associated with a respective one of the BWP configurations 626a-626d of a second communication state 624. The network node 502 may output, such as via an interface, supplementary BWP information 512, which may further indicate the BWP configurations 626a-626d of the second communication state 624 for the supplementary BWPs 622a-622d, respectively. In some aspects, the network node 502 may transmit, and the UE 504 may receive, the supplementary BWP information 512 including the supplementary BWP configurations 626a-626d.

In some aspects, the second communication state 624 may be associated with power conservation. Therefore, each of the supplementary BWP configurations 626a-626d may include at least one parameter that is different from a respective one of the basis BWP configurations 526a-526d.

Illustratively, the basis BWP configuration 526a associated with basis BWP A 522a may include a set of parameters 636a-636c that configure some communication in basis BWP A 522a. For example, a first parameter 636a may configure a number of resources allocated for SRS transmissions by the UE 504 in basis BWP A 522a, a second parameter 636b may configure a number of PUCCH resources that are allocated for UCI transmissions by the UE 504 in basis BWP A 522a, and a third parameter 636c may configure a number of resources allocated for CSI-RS transmissions by the network node 502 in basis BWP A 522a.

Similarly, the supplementary BWP configuration 626a associated with supplementary BWP A' 622a may include a set of parameters 638a-638c that configure some communication in supplementary BWP A' 622a. For example, a first parameter 638a may configure a number of resources allocated for SRS transmissions by the UE 504 in supplementary BWP A' 622a, a second parameter 638b may configure a number of PUCCH resources that are allocated for UCI transmissions by the UE 504 in supplementary BWP A' 622a, and a third parameter 638c may configure a number of resources allocated for CSI-RS transmissions by the network node 502 in supplementary BWP A' 622a.

As the second communication state 624 may be associated with power conservation, the supplementary BWP configurations 626a-626d associated therewith may reduce at least some of the signaling in a corresponding one of the supplementary BWPs 622a-622d relative to a respective one of the basis BWP configurations 526a-526d. For example, the first parameter 638a of the supplementary BWP configuration 626a may reduce the number of resources allocated for SRS transmissions by the UE 504 in the supplementary BWP A' 622a relative to the first parameter 636a of the basis BWP configuration 526a for the basis BWP A 522a. Similarly, the second parameter 638b of the supplementary BWP configuration 626a may reduce the number of PUCCH resources that are allocated for UCI transmissions by the UE 504 in the supplementary BWP A' 622a relative to the second parameter 636b of the basis BWP configuration 526a for the basis BWP A 522a.

In some aspects, however, one or more parameters may be inherited from a basis BWP configuration. A basis BWP configuration may serve as a template for other supplementary BWP configurations associated with other communication states. Thus, the network node 502 may be able to adapt a subset of parameters from a basis BWP configuration when configuring another communication state for a supplementary BWP, and the network node 502 may transmit only those adapted parameters to the UE 504, as opposed to a full set of parameters. In avoiding this redundancy, overhead related to over the air signaling and message size may be mitigated. As illustrated by FIG. 6, for example, the supplementary BWP configuration 626a for supplementary BWP A' 622a may inherit the third parameter 636c from the basis BWP configuration 526a. In other words, the UE 504 may reuse the third parameter 636c from the basis BWP configuration 526a for basis BWP A 522a as the third parameter 638c of the supplementary BWP configuration 626a for supplementary BWP A' 622a. Therefore, the second communication state 624 may not necessarily conserve power in all respects relative to the first communication state 524.

Referring again to FIG. 5, the network node 502 may transmit, to the UE 504, an indication 514 of a communication state. In some aspects, the communication state indication 514 may be implicitly indicated. For example, the network node 502 may activate a BWP for the UE 504, and the activated BWP may correspond to a BWP configuration that is associated with a communication state. By applying the corresponding BWP configuration in the activated BWP, the UE 504 may operate in conformance with the communication state with which the BWP configuration of the activated BWP is associated.

An activated BWP may be a BWP in which the network node 502 and the UE 504 are configured to communicate, and so the network node 502 and the UE 504 may refrain from communicating in portions of the system bandwidth 508 outside of the activated BWP. For example, the network node 502 may activate supplementary BWP A' 622a for the UE 504, and therefore, the UE 504 may be configured to transmit and receive signaling on resources within supplementary BWP A' 622a. Activation of supplementary BWP A' 622a may implicitly indicate the second communication state 624 for the network node 502.

Complementarily, the network node 502 may deactivate a BWP, for example, to cease communication in that BWP. In so doing, the network node 502 may deactivate the BWP configuration associated therewith. Thus, the deactivated BWP configuration may be unavailable for or prohibited from use by the UE 504. The other BWP configurations may be unable to inherit any parameters from the deactivated BWP configuration. In some such instances, the UE 504 may be configured to use another BWP—such as a default BWP or reference BWP—to determine the parameters that would have otherwise been inherited from the deactivated BWP.

The network node 502 may schedule communication with the UE 504 on a set of resources in in the activated supplementary BWP A' 622a. As the set of resources is in a supplementary BWP (here, the activated supplementary BWP A' 622a), the set of resources may be associated with the second communication state 624. In some aspects, to schedule communication with the UE 504 on the set of resources in the activated supplementary BWP A' 622a, the network node 502 may schedule a set of CSI-RSs for the UE 504 on the set of resources. In some other aspects, to schedule communication with the UE 504 on the set of resources in the activated supplementary BWP A' 622a, the network node 502 may schedule a set of SRSs from the UE 504 on the set of resources. In still further aspects, to schedule communication with the UE 504 on the set of resources in the activated supplementary BWP A' 622a, the network node 502 may schedule UCI from the UE 504 on a PUCCH included in the set of resources.

The network node 502 may output information indicating a schedule, which may be intended for the UE 504. For example, an interface of the network node 502 may output the information indicating the schedule for the UE 504. The network node 502 may transmit scheduling information 515 indicating the schedule (such as the schedule for the CSI-RSs, the SRSs, or the UCI on the PUCCH) to the UE 504. The UE 504 may receive the scheduling information 515, and so the UE 504 may be informed of the set(s) of resources on which to receive CSI-RSs, transmit SRSs, or transmit UCI.

In the activated supplementary BWP A' 622a and according to the scheduling information 515, the network node 502 and the UE 504 may communicate on a set of resources that is associated with the second communication state 624. In one example, the UE 504 may transmit, and the network node 502 may receive, SRSs 516 on the set of resources associated with the second communication state 624, such as where the UE 504 sounds over supplementary BWP A' 622a for the network node 502. In another example, the network node 502 may transmit, and the UE 504 may receive, CSI-RSs 518 on the set of resources associated with the second communication state 624. The network node 502 may transmit, and the UE 504 may receive, the CSI-RSs 518 on the set of resources associated with the second communication state 624 based on the BWP configuration 526a corresponding to basis BWP A 522a, as the CSI-RS parameter 638c of the supplementary BWP configuration 626a is inherited from the CSI-RS parameter 636c of the basis BWP configuration 526a. In a further example, the UE 504 may transmit, and the network node 502 may receive, UCI 520 on the set of resources associated with the second communication state 624. The set of resources may include resources of a PUCCH.

Figure 7:
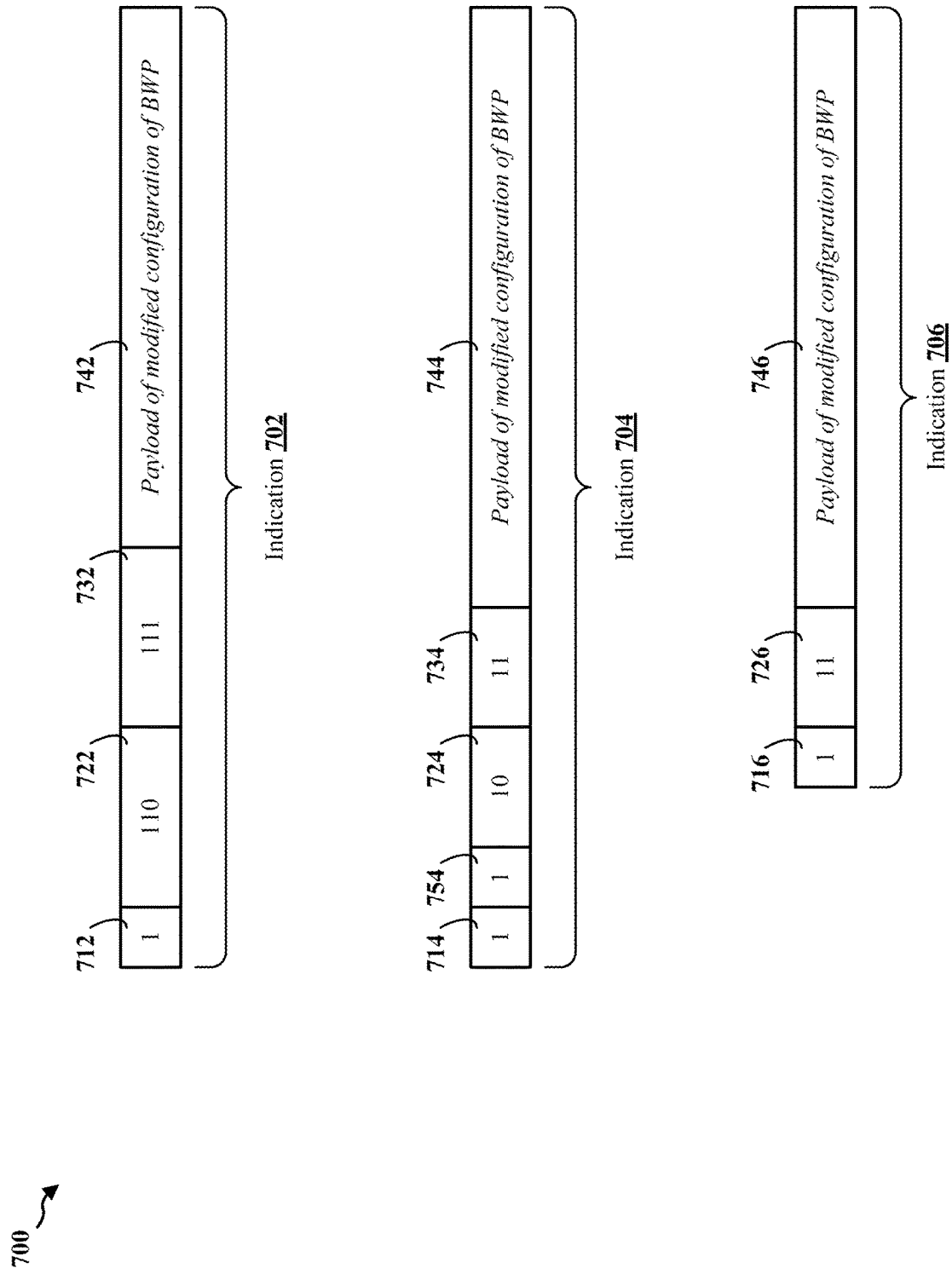
FIG. 7 shows a diagram of example configurations of indications for configuring default BWPs corresponding to communication states.

FIG. 7 shows a diagram of example configurations 700 of indications 702, 704, 706 for configuring default BWPs corresponding to communication states. In some aspects, one communication state, such as the first communication state 524 shown in FIG. 5, may be regarded as a "default," "reference," or "average use case." That is, absent any instruction from a network node regarding which communication state is to be applied in an activated BWP, a UE may default to one of the basis BWP configurations that corresponds to a default basis BWP associated with a first communication state.

In other words, a UE may assume that parameters of the basis BWP configuration corresponding to the default basis BWP are actively in use by a network node for communication with the UE in the absence of an indication of a specific BWP (and corresponding BWP configuration) to be implemented. Any parameters of a supplementary BWP configuration that are to be inherited from an absent, deactivated, or non-indicated other BWP configuration can instead be inherited from a BWP configuration of a default or reference BWP for a communication state.

A network node may transmit one or more indications 702, 704, 706 to a UE, for example, in order to configure or update a default or reference BWP. The network node can update a default BWP within each communication state. In some aspects, the network node may update a default BWP within a communication state via L1 signaling to a UE, such as DCI or a set of PDSCH resources allocated to change BWP configurations. In some other aspects, the network node may update a default BWP using a MAC control element (CE). In still other aspects, the network node may update a default BWP using RRC signaling.

The first indication 702 illustrates an example indication used to update a default BWP, such as where two communication states exist for a network node and each communication state is associated with four (4) BWPs. The first indication 702 includes a default BWP change field 712 that is to be configured with a value used to convey that the indication 702 carries a modification to the default BWP, such as a "1." The first indication 702 further includes a BWP index field 722 that indexes a BWP Y of the X BWPs that is being replaced as the default BWP, where $0 \leq Y \leq X$ and X is the total number of configured BWPs across all communication states. The first indication 702 further includes another BWP index field 732 that indexes a BWP Z of the X BWPs that is the default BWP after updating, where $0 \leq Z \leq X$. Further, the first indication 702 may include a payload 742 that includes a BWP configuration (or updates to a BWP configuration).

With two communication states for a network node and each communication state being associated with four (4) BWPs, the indication 702 may indicate, via the default BWP change field 712, that the default BWP is to be changed from the current default BWP having a BWP index of "6" (as shown by the binary value "110" in the first BWP index field 722) to the new default BWP having a BWP index of "7" (as shown by the binary value "111" in the first BWP index field 732).

The second indication 704 illustrates another example indication used to update a default BWP, such as where two communication states exist for a network node and each communication state is associated with four (4) BWPs. The second indication 704 includes a default BWP change field 714 that is to be configured with a value used to convey that the indication 704 carries a modification to the default BWP, such as a "1." The second indication 704 further includes a communication state index field 754 that indexes a communication state (such as where "0" corresponds to the first communication state associated with the basis BWPs). In addition, the second indication 704 includes a BWP index field 724 that indexes a BWP I of the J BWPs within the indicated communication state that is being replaced as the default BWP, where $0 \leq I \leq J$ and J is the total number of configured BWPs across the communication state indicated by the communication state index field 754. The second indication 704 further includes another BWP index field 734 that indexes a BWP K of the J BWPs that is the default BWP after updating, where $0 \leq K \leq J$. Further, the second indication 704 may include a payload 744 that includes a BWP configuration (or updates to a BWP configuration) for the new default BWP.

With two communication states for a network node and each communication state being associated with four (4) BWPs, the second indication 704 may indicate, via the default BWP change field 714, that the default BWP is to be changed from the current default BWP having a BWP index of "2" in the second communication state (as shown by the binary value "10" in the first BWP index field 724 and "1" in the communication state index field 754, respectively, as the first communication state may be associated with an index of 0) to the new default BWP having a BWP index of "3" (as shown by the binary value "11" in the first BWP index field 732).

The third indication 706 illustrates another example indication used to update a default BWP, such as where two communication states exist for a network node and each communication state is associated with four (4) BWPs. The third indication 706 includes a default BWP change field 716 that is to be configured with a value used to convey that the indication 706 carries a modification to the default BWP, such as a "1." The third indication 706 further includes a BWP index field 726 that indexes a BWP N of the M BWPs within the communication state associated with the currently activated BWP that is being replaced as the default BWP, where 0≤N≤M and M is the total number of configured BWPs across the communication state associated with the currently activated BWP. Further, the third indication 706 may include a payload 746 that includes a BWP configuration (or updates to a BWP configuration) for the new default BWP.

With two communication states for a network node and each communication state being associated with four (4) BWPs, the third indication 706 may indicate, via the default BWP change field 716, that the default BWP is to be changed from the currently activated BWP to the new default BWP having a BWP index of "3" (as shown by the binary value "11" in the first BWP index field 726) within the currently activated BWP.

Figure 8:
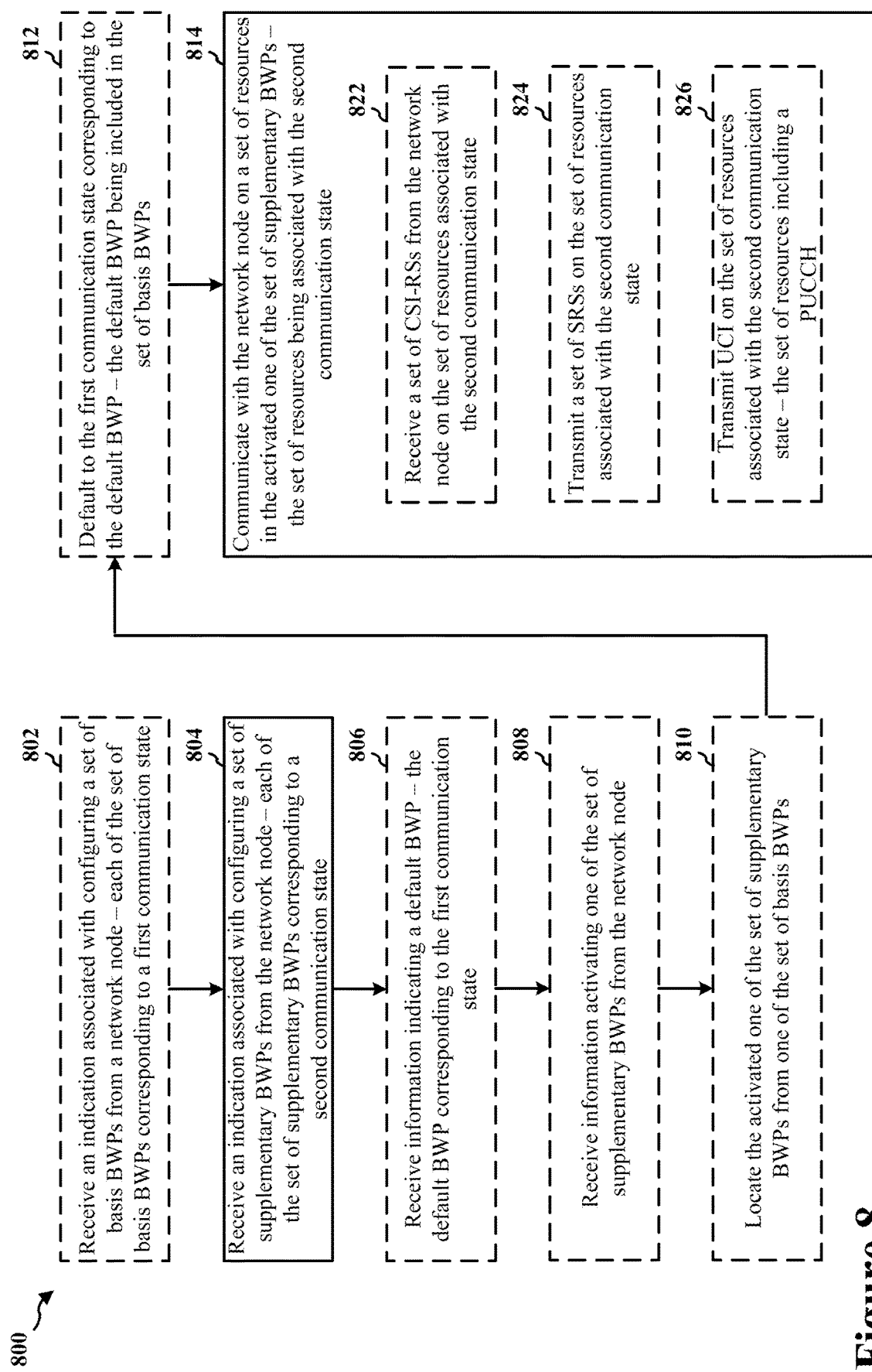
FIG. 8 shows a flowchart of an example method of wireless communication at a UE or another apparatus or a component thereof.

FIG. 8 shows a flowchart of an example method 800 of wireless communication at a UE or another apparatus or a component thereof. The method 800 may be performed by or at a UE (such as the UE 104, 450, 504), another wireless communications apparatus (such as the apparatus 1002), or one or more components thereof. According to various different aspects, one or more of the illustrated blocks may be omitted, transposed, or contemporaneously performed.

At 802, the UE may receive an indication associated with configuring a set of basis BWPs from a network node. Each of the set of basis BWPs may correspond to a first communication state of a set of communication states for the network node. The first communication state may be associated with a first set of parameters that includes at least one of a number of transmit antennas of the network node, a number of ports configured for CSI-RSs, a resource allocation for a PUCCH, a number of repetitions for SRSs, or a number of repetitions for transmissions on the PUCCH.

In the context of FIG. 5 and FIG. 6, in one example, the UE 504 may receive the basis BWP information 510 associated with configuring the set of basis BWPs 522a-522d from the network node 502.

At 804, the UE may receive an indication associated with configuring a set of supplementary BWPs from a network node. Each of the set of supplementary BWPs may correspond to a second communication state of the set of communication states. The second communication state may be associated with a second set of parameters that includes at least one of a number of transmit antennas of the network node, a number of ports configured for CSI-RSs, a resource allocation for a PUCCH, a number of repetitions for SRSs, or a number of repetitions for transmissions on the PUCCH. In some aspects, at least one of the second set of parameters is inherited from the first set of parameters associated with the first communication state.

In the context of FIG. 5 and FIG. 6, in one example, the UE 504 may receive the supplementary BWP information 512 associated with configuring the set of supplementary BWPs 622a-622d from the network node 502.

At 806, the UE may receive information indicating a default BWP. The default BWP may be one of the set of basis BWPs, and the default BWP may correspond to the first communication state. The information indicating the default BWP may be received via at least one of DCI, a transmission on dedicated resources of a PDSCH, a MAC CE, or an RRC signaling message.

In the context of FIG. 5, in one example, the UE 504 may receive information indicating a default BWP included in the set of basis BWPs 522a-522d from the network node 502. In the context of FIG. 7, in one example, the UE 504 may receive one of the indications 702, 704, 706 indicating the default BWP from the network node 502.

At 808, the UE may receive information activating one of the set of supplementary BWPs from the network node.

In the context of FIG. 5 and FIG. 6, in one example, the UE 504 may receive, from the network node 502, the communication state indication 514, and the communication state indication 514 may explicitly or implicitly indicate the activated one of the set of supplementary BWPs 622a-622d.

At 810, the UE may locate the activated one of the supplementary BWPs from one of the set of basis BWPs. In some aspects, the activated one of the set of supplementary BWPs may be at least one of: offset from a center frequency of the one of the set of basis BWPs, at least partially overlapping with the one of the set of basis BWPs, or spanning a smaller frequency range than the one of the set of basis BWPs. Thus, in some aspects, the UE may locate the activated one of the supplementary BWPs from one of the set of basis BWPs by locating a center frequency of the one of the set of basis BWPs, and applying an offset to the center frequency of the one of the set of basis BWPs. From that offset center frequency, the UE may determine a number of subcarriers that are disposed on either side, which may give the UE the one of the set of supplementary BWPs.

In the context of FIG. 5 and FIG. 6, in one example, the UE 504 may locate the activated one of the set of supplementary BWPs 622a-622d from one of the set of basis BWPs 522a-522d. For example, the UE 504 may apply the offset 630 to the center frequency 632a of basis BWP C 522c to locate the center frequency 632b of supplementary BWP C' 622c.

At 812, the UE may default to the first communication state corresponding to the default BWP. The default BWP may be included in the set of basis BWPs, and so may be associated with the first communication state. For example, the UE may determine that a parameter associated with communicating with the network node in the activated supplementary BWP (associated with the second communication state) is absent from a BWP configuration for the activated supplementary BWP. The UE may default to another BWP configuration of a default basis BWP corresponding to the first communication state, and may inherit the absent parameter from the other BWP configuration of the default basis BWP corresponding to the first communication state.

In the context of FIG. 5 and FIG. 6, in one example, the UE 504 may default to the first communication state 524 corresponding to the default BWP, which may be basis BWP A 522a. Accordingly, the UE 504 may apply one or more of the parameters 636-636c from the basis BWP configuration 526a associated with the first communication state 524, for example, when a corresponding one of the parameters is absent from the supplementary BWP configuration corresponding to the activated one of the set of supplementary BWPs 622a-622d.

At 814, the UE may communicate with the network node on a set of resources in the activated one of the set of supplementary BWPs. The set of resources may be associated with the second communication state, for example, in that a BWP configuration corresponding to the activated one of the set of supplementary BWP may indicate the set of resources on which the UE communicates with the network node.

In the context of FIG. 5 and FIG. 6, in one example, the UE 504 may transmit, to the network node 502, the SRSs 516 on a set of resources in the activated one of the set of supplementary BWPs 622a-622d. In another example, the UE 504 may receive, from the network node 502, the CSI-RSs 518 on a set of resources in the activated one of the set of supplementary BWPs 622a-622d. In a further example, the UE 504 may transmit, to the network node 502, the UCI 520 on a set of PUCCH resources in the activated one of the set of supplementary BWPs 622a-622d.

At 822, in some aspects of 814, the UE may receive a set of CSI-RSs from the network node on the set of resources associated with the second communication state. In the context of FIG. 5 and FIG. 6, in one example, the UE 504 may receive, from the network node 502, the CSI-RSs 518 on a set of resources in the activated one of the set of supplementary BWPs 622a-622d.

At 824, in some other aspects of 814, the UE may transmit a set of SRSs on the set of resources associated with the second communication state. In the context of FIG. 5 and FIG. 6, in one example, the UE 504 may transmit, to the network node 502, the SRSs 516 on a set of resources in the activated one of the set of supplementary BWPs 622a-622d.

At 826, in still other aspects of 814, the UE may transmit UCI on the set of resources associated with the second communication state. The set of resources may include a PUCCH.

In the context of FIG. 5 and FIG. 6, in one example, the UE 504 may transmit, to the network node 502, the UCI 520 on a set of PUCCH resources in the activated one of the set of supplementary BWPs 622a-622d.

Figure 9:
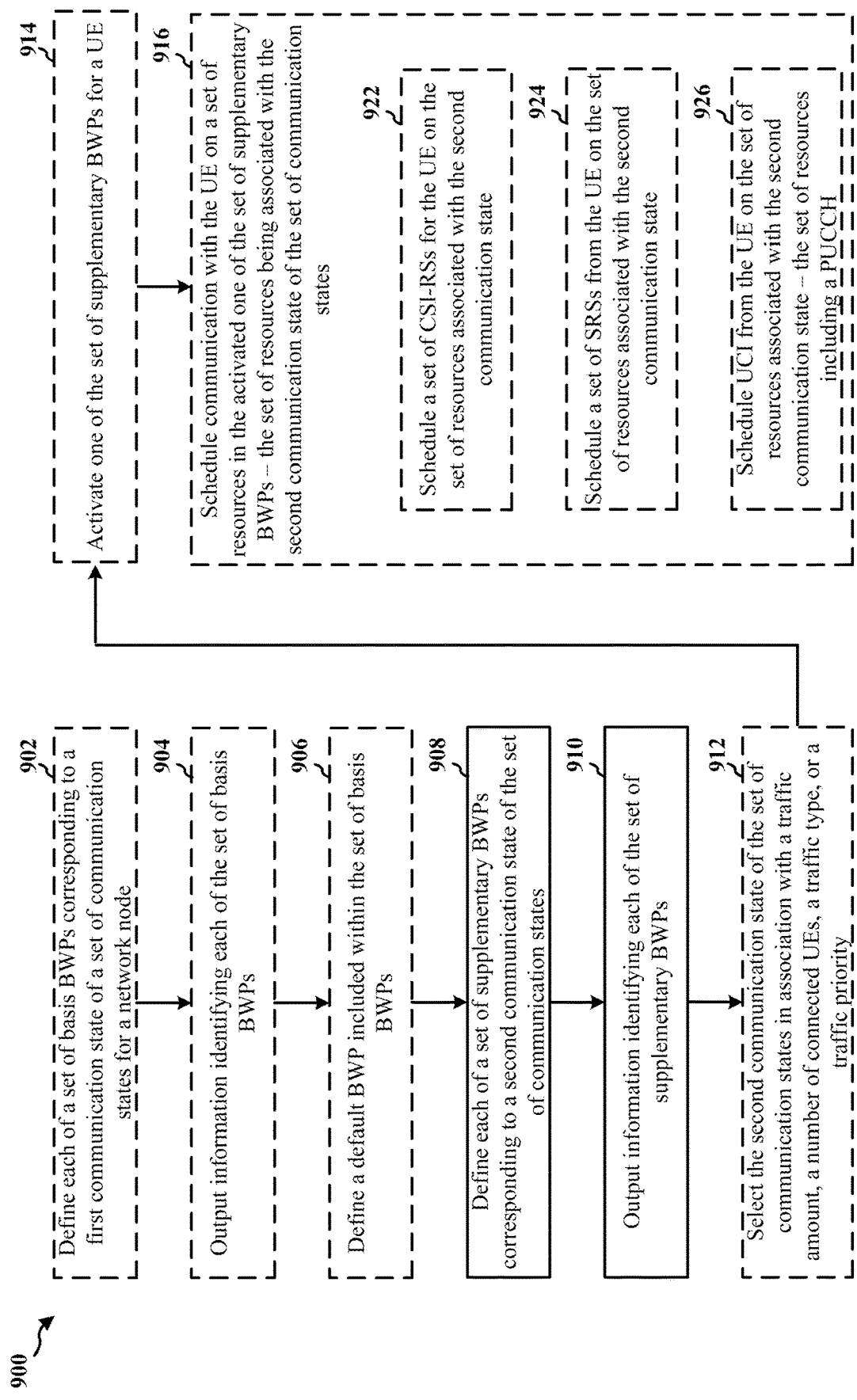
FIG. 9 shows a flowchart of an example method of wireless communication at a network node or another apparatus or a component thereof.

FIG. 9 shows a flowchart of an example method 900 of wireless communication at a network node or another apparatus or a component thereof. The method 900 may be performed by or at a network node (such as a network node 102/180, 410, 502), another wireless communications apparatus (such as the apparatus 1102), or one or more components thereof. According to various different aspects, one or more of the illustrated blocks may be omitted, transposed, or contemporaneously performed.

At 902, the network node may define each of a set of basis BWPs corresponding to a first communication state of a set of communication states for the network node. For example, for each of the set of basis BWPs, the network node may identify a respective center (or carrier) frequency within an available system bandwidth, and the network node may configure a respective number of RBs for the BWP within the available system bandwidth, with an equal (or approximately equal) number of RBs being configured on either side of the center frequency in the frequency domain. In some aspects, the first communication state may be associated with a first set of parameters that includes at least one of a number of receive antennas of the network node, a number of ports configured for CSI-RSs, a resource allocation for a PUCCH, a number of repetitions for SRSs, or a number of repetitions for transmissions on the PUCCH.

In the context of FIG. 5 and FIG. 6, in one example, the network node 502 may define each of the set of basis BWPs 522a-522d. The set of basis BWPs 522a-522d may be associated with the first communication state 524. Accordingly, in some aspects, the network node 502 may configure each of the set of basis BWPs 522a-522d with a respective one of the basis BWP configurations 526a-526d, which may each be associated with the first communication state 524.

At 904, the network node may output information identifying each of the set of basis BWPs. For example, the network node may generate a message that indicates, for each of the set of basis BWPs, a respective center frequency and a respective number of RBs, and the network node may send the information identifying each of the set of basis BWPs via an interface—such as an interface of a bus, an interface of a communication link with an RU or other apparatus, an interface of another communication link with a UE or other terminal device, or another interface.

In the context of FIG. 5 and FIG. 6, in one example, the network node 502 may provide the basis BWP information 510 via an interface, such as an interface of a bus or an interface of a channel on which to communicate with another system or device. The basis BWP information 510 may configure the UE 504 with the set of basis BWPs 522a-522d.

At 906, the network node may define a default BWP included within the set of basis BWPs. For example, the network node may select one BWP of the set of basis BWPs, and the network node may designate the selected basis BWP to be a default BWP. The network node may transmit information indicating the default BWP to the UE. The information indicating the default BWP may be transmitted via at least one of DCI, a transmission on dedicated resources of a PDSCH, a MAC CE, or an RRC signaling message.

As a default BWP, communication between the network node and a UE may default to the default BWP, for example, where the network node fails to activate a BWP for the UE, where the UE fails to successfully acknowledge receiving an indication of activated BWP from the network node, or other scenarios in which a BWP is not successfully activated for the UE. The default BWP is associated with a communication state (such as the first communication state), and therefore is configured with a corresponding BWP configuration. As the BWP configurations for communication states may follow respective BWPs, the BWP configuration corresponding to the default BWP may be similarly regarded as a default BWP configuration. Accordingly, the network node and the UE may apply the default BWP configuration associated with one of the communication states, for example, when defaulting to the default BWP, when the UE fails to successfully receive or acknowledge receiving another BWP configuration, or other scenarios in which a BWP configuration is not configured for the UE.

In the context of FIG. 5, in one example, the network node 502 may define a default BWP by selecting one of the set of basis BWPs 522a-522d and designating the selected one of the set of basis BWPs 522a-522d as the default BWP corresponding to the first communication state 524. The network node 502 may transmit information indicating the default BWP included in the set of basis BWPs 522a-522d to the UE 504. In the context of FIG. 7, in one example, the network node 502 may transmit one of the indications 702, 704, 706 indicating the default BWP to the UE 504.

At 908, the network node may define each of a set of supplementary BWPs corresponding to a second communication state of the set of communication states. For example, for each of the set of supplementary BWPs, the network node may identify a respective center (or carrier) frequency within an available system bandwidth, and the network node may configure a respective number of RBs for the BWP within the available system bandwidth, with an equal (or approximately equal) number of RBs being configured on either side of the center frequency in the frequency domain. Each of the set of supplementary BWPs may be locatable from a respective one of the set of basis BWPs. For example, each of the set of supplementary BWPs may be at least one of offset from a center frequency of a respective one of the set of basis BWPs, at least partially overlapping with a respective one of the set of basis BWPs, or spanning a smaller frequency range than a respective one of the set of basis BWPs. The second communication state may be associated with a second set of parameters that includes at least one of a number of receive antennas of the network node, a number of ports configured for CSI-RSs, a resource allocation for a PUCCH, a number of repetitions for SRSs, or a number of repetitions for transmissions on the PUCCH. In some aspects, at least one of the second set of parameters is inherited from the first set of parameters associated with the first communication state.

In the context of FIG. 5 and FIG. 6, in one example, the network node 502 may select the second communication state 624 for communication with the UE 504 on a set of resources in association with an amount of traffic, a number of connected UEs, a type of traffic, or a priority of traffic.

At 910, the network node may output information identifying each of the set of supplementary BWPs. In some aspects, the network node may generate a message that indicates, for each of the set of supplementary BWPs, a respective center frequency and a respective number of RBs. In some other aspects, the network node may generate a message that indicates a location of each of the set of supplementary BWPs relative to a respective one of the set of basis BWPs. For example, the network node may generate a message that indicates a respective offset from a respective one of the set of basis BWPs for each of the set of supplementary BWPs. The offset may indicate a respective center frequency of each of the set of supplementary BWPs, and the network node may further include in the message a respective number of RBs spanned by each of the set of supplementary BWPs in the frequency domain. The network node may send the information identifying each of the set of supplementary BWPs via an interface—such as an interface of a bus, an interface of a communication link with an RU or other apparatus, an interface of another communication link with a UE or other terminal device, or another interface.

In the context of FIG. 5 and FIG. 6, in one example, the network node 502 may provide the supplementary BWP information 512 via an interface, such as an interface of a bus or an interface of a channel on which to communicate with another system or device. The supplementary BWP information 512 may configure the UE 504 with the set of supplementary BWPs 622a-622d.

At 912, the network node may select the second communication state for communication with the UE on a set of resources in association with an amount of traffic associated with the network node, a number of connected UEs associated with the network node, a type of traffic associated with the network node, or a priority of traffic associated with the network node. For example, the network node may count UEs in a cell provided by or associated with the network node (such as a cell provided by an RU with which the network node communicates). The network node may count all UEs, all UEs currently connected to the network node (such as UEs in an RRC_Connected state), a number of UEs associated with a certain type of traffic in the cell, or a number of UEs having a certain priority associated therewith. The network node may compare the count with a threshold, and based on the comparison, the network node may select the second communication state. For example, if the network node determines that the count fails to meet or exceed the threshold, then the network node may assume that a relatively low number of UEs are operating in the cell, the UEs operating in the cell are associated with a lower priority, and so forth. Accordingly, the network node may be able to serve such UEs or traffic associated therewith with some reduced signaling associated with the second communication state, which may conserve some power at one or both the UEs or the network node.

In the context of FIG. 5 and FIG. 6, in one example, the network node 502 may select the second communication state 624 based on an amount of traffic associated with the network node 502, a number of connected UEs associated with the network node 502, a type of traffic associated with the network node 502, or a priority of traffic associated with the network node 502.

At 914, the network node may activate one of the set of supplementary BWPs for the UE. For example, the network node may select one of the set of supplementary BWPs in which to schedule signaling to or from the UE, and the network node may transmit information indicating the activated one of the set of supplementary BWPs to the UE. While the selected one of the set of supplementary BWPs is activated, the network node may refrain from scheduling signaling to or from the UE in any other BWPs.

In the context of FIG. 5 and FIG. 6, in one example, the network node 502 may activate one of the set of supplementary BWPs 622a-622d for the UE 504. The network node 502 may transmit, to the UE 504, the communication state indication 514, and the communication state indication 514 may explicitly or implicitly indicate the activated one of the set of supplementary BWPs 622a-622d.

At 916, the network node may schedule communication with the UE on a set of resources in the activated one of the set of supplementary BWPs. The set of resources may be associated with the second communication state, for example, in that a BWP configuration corresponding to the activated one of the set of supplementary BWPs may indicate the set of resources on which the network node communicates with the UE. In some aspects, the network node may schedule communication with the UE by determining which resources in the activated one of the set of supplementary BWPs are available, such as which resources are unscheduled or unoccupied in the activated one of the set of supplementary BWPs. The network node may allocate a set of resources in the activated one of the set of supplementary BWPs from those resources determined to be available. The network node may output information indicating the schedule for the UE, and the information indicating the schedule may be transmitted to the UE.

In the context of FIG. 5 and FIG. 6, in one example, the network node 502 may schedule at least one of the SRSs 516, the CSI-RSs 518, or the UCI 520 on a set of resources in the activated one of the set of supplementary BWPs 622a-622d corresponding to one of the set of supplementary BWP configurations 626a-626d of the second communication state 624. The network node 502 may generate the scheduling information 515 to indicate the scheduled at least one of the SRS 516, CSI-RSs 518, or UCI 520, and the scheduling information 515 may be transmitted to the UE 504.

At 922, in some aspects of 916, the network node may schedule a set of CSI-RSs for the UE on the set of resources associated with the second communication state. For example, the network node may determine which resources in the activated one of the set of supplementary BWPs are available to carry CSI-RSs, and the network node may determine a number of CSI-RSs or a number of ports for CSI-RSs. The network node may allocate, from among the resources available for CSI-RSs, the set of resources to CSI-RSs for the UE, for example, according to the number of CSI-RSs or number of ports. The network node may generate a message to indicate the resource allocation on which the CSI-RSs are scheduled, and the message may be transmitted to the UE.

In the context of FIG. 5 and FIG. 6, in one example, the network node 502 may schedule a set of CSI-RSs 518 for the UE 504 on the set of resources associated with the second communication state 624. The network node 502 may transmit the scheduling information 515 to the UE 504 to indicate the allocated resources on which the CSI-RSs 518 are scheduled. Accordingly, the network node 502 may transmit, to the UE 504, the CSI-RSs 518 on the set of resources in the activated one of the set of supplementary BWPs 622a-622d.

At 924, in some other aspects of 916, the network node may schedule a set of SRSs from the UE on the set of resources associated with the second communication state. For example, the network node may determine which resources in the activated one of the set of supplementary BWPs are available to carry SRSs, and the network node may determine a number of SRSs or a number of ports for SRSs. The network node may allocate, from among the resources available for SRSs, the set of resources for SRSs from the UE, for example, according to the number of SRSs or number of ports. The network node may generate a message to indicate the resource allocation on which the SRSs are scheduled, and the message may be transmitted to the UE.

In the context of FIG. 5 and FIG. 6, in one example, the network node 502 may schedule a set of SRSs 516 from the UE 504 on the set of resources associated with the second communication state 624. The network node 502 may transmit the scheduling information 515 to the UE 504 to indicate the allocated resources on which the SRSs 516 are scheduled. Accordingly, the network node 502 may receive, from the UE 504, the SRSs 516 on the scheduled set of resources in the activated one of the set of supplementary BWPs 622a-622d.

At 926, in some other aspects of 916, the network node may schedule UCI from the UE on the set of resources associated with the second communication state. For example, the network node may determine content the UE is to include in UCI, such as ACK/NACK feedback, SRs, or CSI. The network node may determine which resources in the activated one of the set of supplementary BWPs are PUCCH resources and, in some aspects, whether sufficient PUCCH resources are available to carry multiplexed ACK/NACK feedback, SRs, and CSI or whether the UE should drop CSI. The network node may allocate, from among the available PUCCH resources, the set of PUCCH resources for UCI from the UE, for example, according to the content the UE is to include in the UCI. The network node may generate a message to indicate the PUCCH resource allocation on which the UCI is scheduled, and the message may be transmitted to the UE.

In the context of FIG. 5 and FIG. 6, in one example, the network node 502 may schedule UCI 520 from the UE 504 on a set of PUCCH resources associated with the second communication state 624. The network node 502 may transmit the scheduling information 515 to the UE 504 to indicate the allocated PUCCH resources on which the UCI 520 is scheduled. Accordingly, the network node 502 may receive, from the UE 504, the UCI 520 on the scheduled set of PUCCH resources in the activated one of the set of supplementary BWPs 622a-622d.

Figure 10:
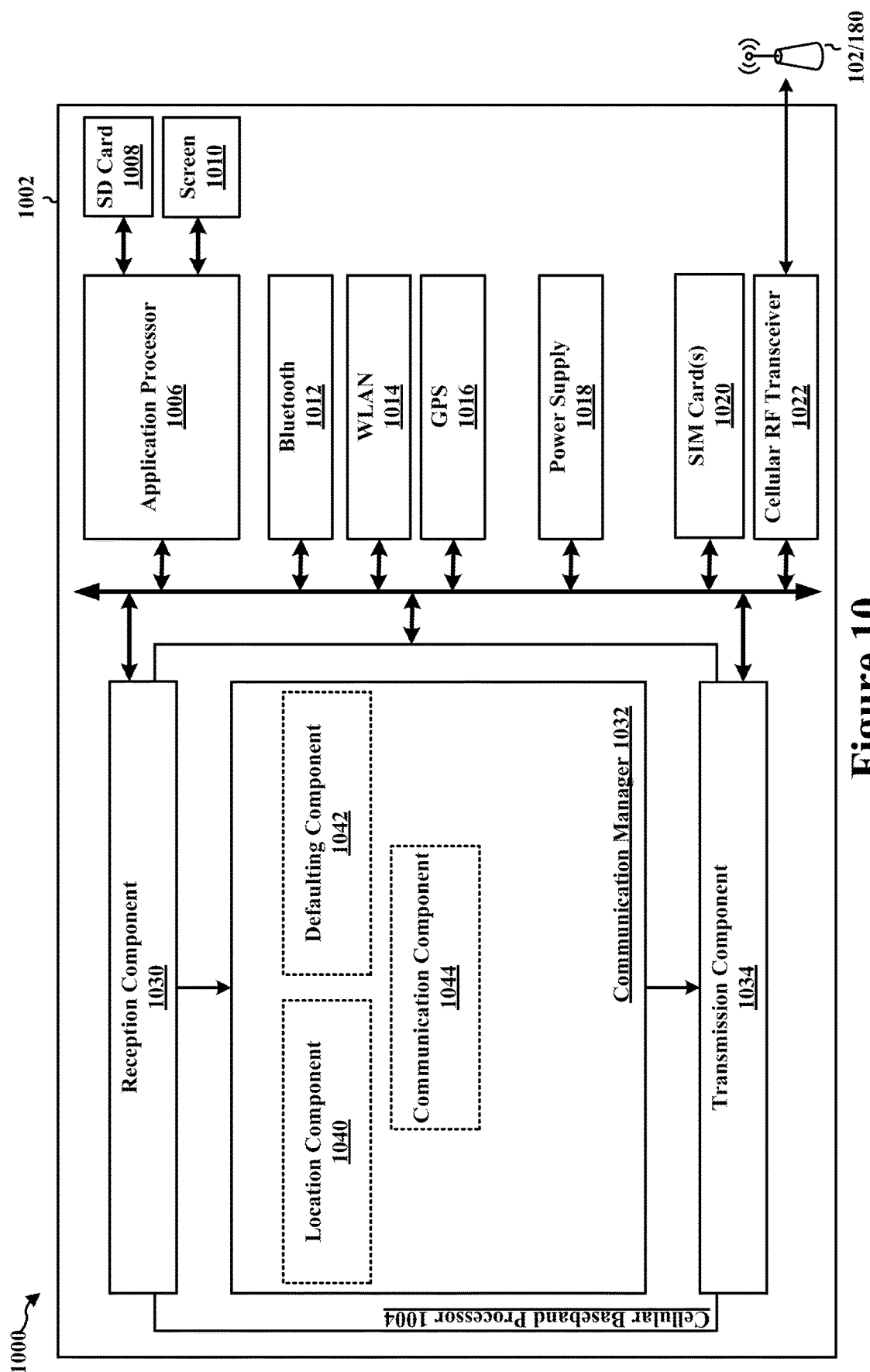
FIG. 10 shows a diagram of an example hardware implementation for an apparatus.

FIG. 10 is a diagram 1000 illustrating an example of a hardware implementation for an apparatus 1002. The apparatus 1002 may be a UE or similar device, or the apparatus 1002 may be a component of a UE or similar device. For example, the apparatus 1002 may be an example of, or an example component of, one or more of the UE 104 depicted in FIGS. 1 and 2 and described in the context thereof, the UE 450 depicted in FIG. 4 and described in the context thereof, or the UE 504 depicted in FIG. 5 and described in the context thereof.

The apparatus 1002 may include a cellular baseband processor 1004 (also referred to as a modem or a processing system) and a cellular RF transceiver 1022, which may be coupled together or integrated into the same package, component, circuit, chip, or other circuitry. In some aspects, the apparatus 1002 may accept or may include one or more subscriber identity modules (SIM) cards 1020, which may include one or more integrated circuits, chips, or similar circuitry, and which may be removable or embedded. The one or more SIM cards 1020 may carry identification or authentication information, such as an international mobile subscriber identity (IMSI) or IMSI-related key(s). Further, the apparatus 1002 may include one or more of an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018.

The cellular baseband processor 1004 communicates through the cellular RF transceiver 1022 with the UE 104 or the network node 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described herein. The computer-readable medium/memory may also be used for storing data that is manipulated by the cellular baseband processor 1004 when executing software.

In the context of FIG. 4, the cellular baseband processor 1004 may be a component of the UE 450 and may include the memory 460 or at least one of the TX processor 468, the RX processor 456, or the controller/processor 459. In one configuration, the apparatus 1002 may be a modem chip or may be implemented as the baseband processor 1004, while in another configuration, the apparatus 1002 may be the entire UE (such as the UE 450 of FIG. 4) and may include some or all of the abovementioned components, circuits, chips, or other circuitry illustrated in the context of the apparatus 1002. In one configuration, the cellular RF transceiver 1022 may be implemented as at least one of the transmitter 454TX or the receiver 454RX.

The cellular baseband processor 1004 may include a communication manager 1032, and further, may include or may be connected with a reception component 1030 and a transmission component 1034. The reception component 1030 and the transmission component 1034 may be separately implemented or may be at least partially implemented in one component, such as a transceiver component. Each of the reception component 1030, the communication manager 1032, and the transmission component 1034 may be implemented in hardware, software, firmware, or any combination thereof.

The reception component 1030 may function as an interface for signaling into the cellular baseband processor 1004 or the communication manager 1032. For example, the reception component 1030 may be an interface of a processor or a processing system and may provide some or all data or control information included in received signaling to the communication manager 1032. The transmission component 1034 may function as an interface for signaling out of the cellular baseband processor 1004 or the communication manager 1032. For example, the transmission component 1034 may be an interface of a processor or a processing system and may provide some or all data or control information to be included in signaling to the cellular RF transceiver 1022 from the communication manager 1032. Further, the communication manager 1032 may generate and provide some or all of the data or control information to be included in transmitted signaling to the transmission component 1034.

The communication manager 1032 may include the various illustrated components, including one or more components configured to process received data or control information, or one or more components configured to generate data or control information for transmission. For example, the communication manager 1032 may include a location component 1040, a defaulting component 1042, and a communication component 1044. The components within the communication manager 1032 may be stored in computer-readable medium/memory or configured as hardware within the cellular baseband processor 1004.

The reception component 1030 may be configured to receive an indication associated with configuring a set of basis BWPs from a network node 102/180, such as described in connection with 802 of FIG. 8. Each of the set of basis BWPs may correspond to a first communication state of a set of communication states for the network node 102/180. The first communication state may be associated with a first set of parameters that includes at least one of a number of transmit antennas of the network node 102/180, a number of ports configured for CSI-RSs, a resource allocation for a PUCCH, a number of repetitions for SRSs, or a number of repetitions for transmissions on the PUCCH.

The reception component 1030 may be further configured to receive an indication associated with configuring a set of supplementary BWPs from a network node 102/180, such as described in connection with 804 of FIG. 8. Each of the set of supplementary BWPs may correspond to a second communication state of the set of communication states. The second communication state may be associated with a second set of parameters that includes at least one of a number of transmit antennas of the network node 102/180, a number of ports configured for CSI-RSs, a resource allocation for a PUCCH, a number of repetitions for SRSs, or a number of repetitions for transmissions on the PUCCH. In some aspects, at least one of the second set of parameters is inherited from the first set of parameters associated with the first communication state.

The reception component 1030 may be further configured to receive information indicating a default BWP, such as described in connection with 806 of FIG. 8. The default BWP may be one of the set of basis BWPs, and the default BWP may correspond to the first communication state. The information indicating the default BWP may be received via at least one of DCI, a transmission on dedicated resources of a PDSCH, a MAC CE, or an RRC signaling message.

The reception component 1030 may be further configured to receive information activating one of the set of supplementary BWPs from the network node 102/180, such as described in connection with 808 of FIG. 8.

The location component 1040 may be configured to locate the activated one of the supplementary BWPs from one of the set of basis BWPs, such as described in connection with 810 of FIG. 8. In some aspects, the activated one of the set of supplementary BWPs may be at least one of: offset from a center frequency of the one of the set of basis BWPs, at least partially overlapping with the one of the set of basis BWPs, or spanning a smaller frequency range than the one of the set of basis BWPs. Thus, in some aspects, the location component 1040 may locate the activated one of the supplementary BWPs from one of the set of basis BWPs by locating a center frequency of the one of the set of basis BWPs, and applying an offset to the center frequency of the one of the set of basis BWPs. From that offset center frequency, the location component 1040 may determine a number of subcarriers that are disposed on either side, which may provide the one of the set of supplementary BWPs.

The defaulting component 1042 may default to the first communication state corresponding to the default BWP, such as described in connection with 812 of FIG. 8. The default BWP may be included in the set of basis BWPs, and so may be associated with the first communication state. For example, the defaulting component 1042 may determine that a parameter associated with communicating with the network node 102/180 in the activated supplementary BWP (associated with the second communication state) is absent from a BWP configuration for the activated supplementary BWP. The defaulting component 1042 may default to another BWP configuration of a default basis BWP corresponding to the first communication state, and may inherit the absent parameter from the other BWP configuration of the default basis BWP corresponding to the first communication state.

The communication component 1044 may be configured to communicate with the network node 102/180 on a set of resources in the activated one of the set of supplementary BWPs, such as described in connection with 814 of FIG. 8. The set of resources may be associated with the second communication state, for example, in that a BWP configuration corresponding to the activated one of the set of supplementary BWP may indicate the set of resources on which the UE communicates with the network node 102/180.

The communication component 1044 may be configured to cause the reception component 1030 to receive a set of CSI-RSs from the network node 102/180 on the set of resources associated with the second communication state, such as described in connection with 822 of FIG. 8.

The communication component 1044 may be configured to cause the transmission component 1034 to transmit a set of SRSs on the set of resources associated with the second communication state, such as described in connection with 824 of FIG. 8.

The communication component 1044 may be configured to cause the transmission component 1034 to transmit UCI on the set of resources associated with the second communication state, such as described in connection with 826 of FIG. 8. The set of resources may include a PUCCH.

The apparatus 1002 may include additional components that perform some or all of the blocks, operations, signaling, and so forth of the algorithms in the aforementioned call flow diagrams or flowcharts of FIG. 5 and FIG. 8. As such, some or all of the blocks, operations, signaling, and so forth in the aforementioned call flow diagrams or flowcharts of FIG. 5 and FIG. 8 may be performed by one or more components and the apparatus 1002 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving an indication associated with configuring a first set of BWPs from a network node, each of the first set of BWPs corresponding to a first communication state of a set of communication states for the network node; and means for communicating with the network node on a set of resources in one of the first set of BWPs, the set of resources being associated with the first communication state of the set of communication states.

In one configuration, the means for communicating with the network node on the set of resources is configured to at least one of: receive a set of CSI-RSs from the network node on the set of resources associated with the first communication state, transmit a set of SRSs on the set of resources associated with the first communication state, or transmit UCI on the set of resources associated with the first communication state and the set of resources includes a PUCCH.

In one configuration, the apparatus 1002, and in particular the cellular baseband processor 1004, includes means for receiving an indication associated with configuring a second set of BWPs from the network node, each of the second set of BWPs corresponding to a second communication state of the set of communication states; and means for locating the one of the first set of BWPs from one of the second set of BWPs.

In one configuration, the one of the first set of BWPs is at least one of: offset from a center frequency of the one of the second set of BWPs, at least partially overlaps with the one of the second set of BWPs, or spans a smaller range than the one of the second set of BWPs.

In one configuration, the first communication state is associated with a first set of parameters that includes at least one of: a number of transmit antennas of the network node, a number of ports configured for CSI-RSs, a resource allocation for a PUCCH, a number of repetitions for SRSs, or a number of repetitions for transmissions on the PUCCH.

In one configuration, at least one of the first set of parameters is inherited from a second set of parameters associated with the second communication state of the set of communication states corresponding to the one of the second set of BWPs.

In one configuration, the apparatus 1002, and in particular the cellular baseband processor 1004, includes means for defaulting to the second communication state, and the one of the second set of BWPs includes a default BWP.

In one configuration, the apparatus 1002, and in particular the cellular baseband processor 1004, includes means for receiving information indicating the default BWP, the default BWP corresponding to the second communication state.

In one configuration, the information indicating the default BWP is received via at least one of: DCI, a transmission on dedicated resources of a PDSCH, a MAC CE, or an RRC signaling message.

In one configuration, the apparatus 1002, and in particular the cellular baseband processor 1004, includes means for receiving information activating the one of the first set of BWPs from the network node, and the means for communicating with the network node on the set of resources in the one of the first set of BWPs is configured to communicate in the one of the first set of BWPs when the one of the first set of BWPs is active.

The aforementioned means may be one or more of the aforementioned components of the apparatus 1002 configured to perform the functions recited by the aforementioned means. As described herein, the apparatus 1002 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

Figure 11:
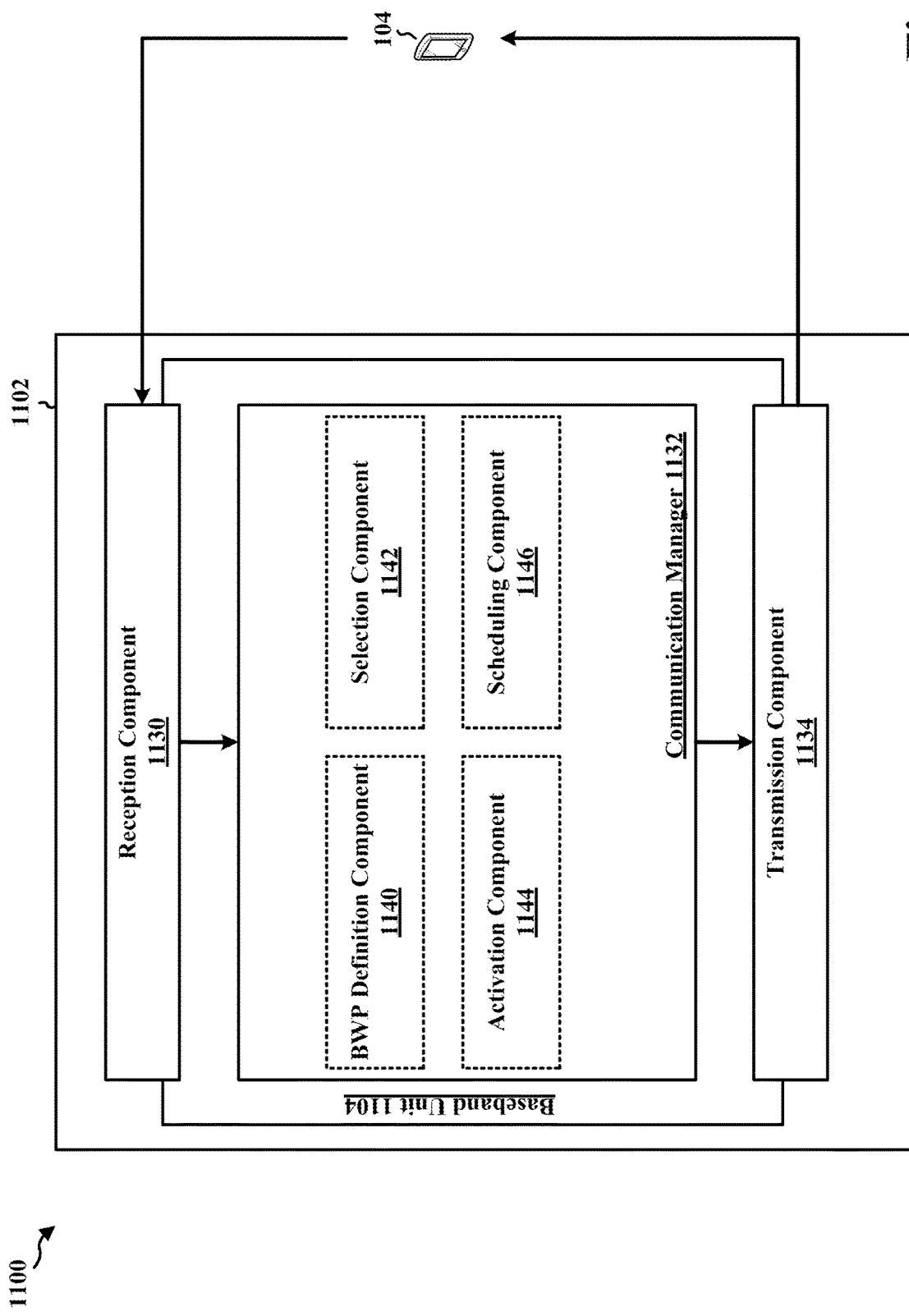
FIG. 11 shows a diagram of another example hardware implementation for another apparatus.

FIG. 11 is a diagram 1100 illustrating an example of a hardware implementation for an apparatus 1102. The apparatus 1102 may be a network node or similar device or system, or the apparatus 1102 may be a component of a network node or similar device or system. For example, the apparatus 1102 may be an example of, or an example component of, one or more of a network node 102 depicted in FIG. 1 and described in the context thereof, a CU 210, a DU 230, an RU 240, or any combination thereof as depicted in FIG. 2 and described in the context thereof, the network node 410 depicted in FIG. 4 and described in the context thereof, or the network node 502 depicted in FIG. 5 and described in the context thereof.

The apparatus 1102 may include a baseband unit 1104, which may be implemented as or included in a processing system, in some aspects. The baseband unit 1104 may communicate through a cellular RF transceiver. For example, the baseband unit 1104 may communicate through a cellular RF transceiver with a UE 104, such as for downlink or uplink communication, or with a network node 102/180, such as for IAB.

The baseband unit 1104 may include a computer-readable medium/memory, which may be non-transitory. The baseband unit 1104 is responsible for general processing, including the execution of software stored on the computer-readable medium/memory. The software, when executed by the baseband unit 1104, causes the baseband unit 1104 to perform the various functions described herein. The computer-readable medium/memory may also be used for storing data that is manipulated by the baseband unit 1104 when executing software.

The baseband unit 1104 may include a communication manager 1132, and further, may include or may be connected with a reception component 1130 and a transmission component 1134. The reception component 1130 and the transmission component 1134 may be separately implemented or may be at least partially implemented in one component, such as a transceiver component. Each of the reception component 1130, the communication manager 1132, and the transmission component 1134 may be implemented in hardware, software, firmware, or any combination thereof.

The reception component 1130 may function as an interface for signaling into the baseband unit 1104 or the communication manager 1132. For example, the reception component 1130 may be an interface of a processor or a processing system and may provide some or all data or control information included in received signaling to the communication manager 1132. The transmission component 1134 may function as an interface for signaling out of the baseband unit 1104 or the communication manager 1132. For example, the transmission component 1134 may be an interface of a processor or a processing system and may provide some or all data or control information to be included in signaling from the communication manager 1132. Further, the communication manager 1132 may generate and provide some or all of the data or control information to be included in transmitted signaling to the transmission component 1134.

The communication manager 1132 includes the one or more illustrated components. The components within the communication manager 1132 may be stored in the computer-readable medium/memory or configured as hardware within the baseband unit 1104. In the context of FIG. 4, the baseband unit 1104 may be a component of the network node 410 and may include the memory 476 or at least one of the TX processor 416, the RX processor 470, and the controller/processor 475.

The reception component 1130 may be configured to receive signaling on a wireless channel, such as signaling from a UE 104 or network node 102/180. The transmission component 1134 may be configured to transmit signaling on a wireless channel, such as signaling to a UE 104 or network node 102/180. The communication manager 1132 may coordinate or manage some or all wireless communications by the apparatus 1102, including across the reception component 1130 and the transmission component 1134.

The reception component 1130 may provide some or all data or control information included in received signaling to the communication manager 1132, and the communication manager 1132 may generate and provide some or all of the data or control information to be included in transmitted signaling to the transmission component 1134. In some aspects, the generation of data or control information may include packetizing or otherwise reformatting data or control information received from a core network, such as the core network 190 or the EPC 160, for transmission. The communication manager 1132 may include the various illustrated components, including one or more components configured to process received data or control information, or one or more components configured to generate data or control information for transmission. For example, the communication manager 1132 may include a BWP definition component 1140, a selection component 1142, an activation component 1144, and a scheduling component 1146.

The BWP definition component 1140 may define each of a set of basis BWPs corresponding to a first communication state of a set of communication states for the apparatus 1102, such as described in connection with 902 of FIG. 9. For example, for each of the set of basis BWPs, the BWP definition component 1140 may identify a respective center (or carrier) frequency within an available system bandwidth, and the BWP definition component 1140 may configure a respective number of RBs for the BWP within the available system bandwidth, with an equal (or approximately equal) number of RBs being configured on either side of the center frequency in the frequency domain. In some aspects, the first communication state may be associated with a first set of parameters that includes at least one of a number of receive antennas of the apparatus 1102, a number of ports configured for CSI-RSs, a resource allocation for a PUCCH, a number of repetitions for SRSs, or a number of repetitions for transmissions on the PUCCH.

The transmission component 1134 may output information identifying each of the set of basis BWPs, such as described in connection with 904 of FIG. 9. For example, the transmission component 1134 may generate a message that indicates, for each of the set of basis BWPs, a respective center frequency and a respective number of RBs, and the transmission component 1134 may send the information identifying each of the set of basis BWPs via an interface— such as an interface of a bus, an interface of a communication link with an RU or other apparatus, an interface of another communication link with a UE 104 or other terminal device, or another interface.

The BWP definition component 1140 may define a default BWP included within the set of basis BWPs, such as described in connection with 906 of FIG. 9. For example, the BWP definition component 1140 may select one BWP of the set of basis BWPs, and the BWP definition component 1140 may designate the selected basis BWP to be a default BWP. The transmission component 1134 may transmit information indicating the default BWP to the UE 104. The information indicating the default BWP may be transmitted via at least one of DCI, a transmission on dedicated resources of a PDSCH, a MAC CE, or an RRC signaling message.

As a default BWP, communication between the apparatus 1102 and a UE 104 may default to the default BWP, for example, where the activation component 1144 fails to activate a BWP for the UE 104, where the UE 104 fails to successfully acknowledge receiving an indication of activated BWP from the apparatus 1102, or other scenarios in which a BWP is not successfully activated for the UE 104. The default BWP is associated with a communication state (such as the first communication state), and therefore is configured with a corresponding BWP configuration. As the BWP configurations for communication states may follow respective BWPs, the BWP configuration corresponding to the default BWP may be similarly regarded as a default BWP configuration. Accordingly, the apparatus 1102 (such as the scheduling component 1146) and the UE 104 may apply the default BWP configuration associated with one of the communication states, for example, when defaulting to the default BWP, when the UE 104 fails to successfully receive or acknowledge receiving another BWP configuration, or other scenarios in which a BWP configuration is not configured for the UE 104.

The BWP definition component 1140 may define each of a set of supplementary BWPs corresponding to a second communication state of the set of communication states, such as described in connection with 908 of FIG. 9. For example, for each of the set of supplementary BWPs, the BWP definition component 1140 may identify a respective center (or carrier) frequency within an available system bandwidth, and the BWP definition component 1140 may configure a respective number of RBs for the BWP within the available system bandwidth, with an equal (or approximately equal) number of RBs being configured on either side of the center frequency in the frequency domain. Each of the set of supplementary BWPs may be locatable from a respective one of the set of basis BWPs. For example, each of the set of supplementary BWPs may be at least one of offset from a center frequency of a respective one of the set of basis BWPs, at least partially overlapping with a respective one of the set of basis BWPs, or spanning a smaller frequency range than a respective one of the set of basis BWPs. The second communication state may be associated with a second set of parameters that includes at least one of a number of receive antennas of the apparatus 1102, a number of ports configured for CSI-RSs, a resource allocation for a PUCCH, a number of repetitions for SRSs, or a number of repetitions for transmissions on the PUCCH. In some aspects, at least one of the second set of parameters is inherited from the first set of parameters associated with the first communication state.

The transmission component 1134 may output information identifying each of the set of supplementary BWPs, such as described in connection with 910 of FIG. 9. In some aspects, the transmission component 1134 may generate a message that indicates, for each of the set of supplementary BWPs, a respective center frequency and a respective number of RBs. In some other aspects, the transmission component 1134 may generate a message that indicates a location of each of the set of supplementary BWPs relative to a respective one of the set of basis BWPs. For example, the transmission component 1134 may generate a message that indicates a respective offset from a respective one of the set of basis BWPs for each of the set of supplementary BWPs. The offset may indicate a respective center frequency of each of the set of supplementary BWPs, and the transmission component 1134 may further include in the message a respective number of RBs spanned by each of the set of supplementary BWPs in the frequency domain. The transmission component 1134 may send the information identifying each of the set of supplementary BWPs via an interface—such as an interface of a bus, an interface of a communication link with an RU or other apparatus, an interface of another communication link with a UE 104 or other terminal device, or another interface.

The selection component 1142 may select the second communication state for communication with the UE 104 on a set of resources in association with an amount of traffic associated with the apparatus 1102, a number of connected UEs 104 associated with the apparatus 1102, a type of traffic associated with the apparatus 1102, or a priority of traffic associated with the apparatus 1102, such as described in connection with 912 of FIG. 9. For example, the selection component 1142 may count UEs 104 in a cell provided by or associated with the apparatus 1102. The selection component 1142 may count all UEs 104, all UEs 104 currently connected to the apparatus 1102 (such as UEs 104 in an RRC_Connected state), a number of UEs 104 associated with a certain type of traffic in the cell, or a number of UEs 104 having a certain priority associated therewith. The selection component 1142 may compare the count with a threshold, and based on the comparison, the selection component 1142 may select the second communication state. For example, if the selection component 1142 determines that the count fails to meet or exceed the threshold, then the selection component 1142 may assume that a relatively low number of UEs 104 are operating in the cell, the UEs 104 operating in the cell are associated with a lower priority, and so forth. Accordingly, the apparatus 1102 may be able to serve such UEs 104 or traffic associated therewith with some reduced signaling associated with the second communication state, which may conserve some power at one or both the UEs 104 or the apparatus 1102.

The activation component 1144 may activate one of the set of supplementary BWPs for the UE 104, such as described in connection with 914 of FIG. 9. For example, the activation component 1144 may select one of the set of supplementary BWPs in which to schedule signaling to or from the UE 104, and the transmission component 1134 may transmit information indicating the activated one of the set of supplementary BWPs to the UE 104. While the selected one of the set of supplementary BWPs is activated, the scheduling component 1146 may refrain from scheduling signaling to or from the UE 104 in any other BWPs.

The scheduling component 1146 may schedule communication with the UE 104 on a set of resources in the activated one of the set of supplementary BWPs, such as described in connection with 916 of FIG. 9. The set of resources may be associated with the second communication state, for example, in that a BWP configuration corresponding to the activated one of the set of supplementary BWPs may indicate the set of resources on which the apparatus 1102 communicates with the UE 104. In some aspects, the scheduling component 1146 may schedule communication with the UE 104 by determining which resources in the activated one of the set of supplementary BWPs are available, such as which resources are unscheduled or unoccupied in the activated one of the set of supplementary BWPs. The scheduling component 1146 may allocate a set of resources in the activated one of the set of supplementary BWPs from those resources determined to be available. The transmission component 1134 may output information indicating the schedule for the UE 104, and the information indicating the schedule may be transmitted to the UE 104.

In some aspects, the scheduling component 1146 may schedule a set of CSI-RSs for the UE 104 on the set of resources associated with the second communication state, such as described in connection with 922 of FIG. 9. For example, the scheduling component 1146 may determine which resources in the activated one of the set of supplementary BWPs are available to carry CSI-RSs, and the scheduling component 1146 may determine a number of CSI-RSs or a number of ports for CSI-RSs. The scheduling component 1146 may allocate, from among the resources available for CSI-RSs, the set of resources to CSI-RSs for the UE 104, for example, according to the number of CSI-RSs or number of ports. The transmission component 1134 may generate a message to indicate the resource allocation on which the CSI-RSs are scheduled, and the message may be transmitted to the UE 104.

In some other aspects, the scheduling component 1146 may schedule a set of SRSs from the UE 104 on the set of resources associated with the second communication state, such as described in connection with 924 of FIG. 9. For example, the scheduling component 1146 may determine which resources in the activated one of the set of supplementary BWPs are available to carry SRSs, and the scheduling component 1146 may determine a number of SRSs or a number of ports for SRSs. The scheduling component 1146 may allocate, from among the resources available for SRSs, the set of resources for SRSs from the UE 104, for example, according to the number of SRSs or number of ports. The transmission component 1134 may generate a message to indicate the resource allocation on which the SRSs are scheduled, and the message may be transmitted to the UE 104.

In some other aspects, the scheduling component 1146 may schedule UCI from the UE 104 on the set of resources associated with the second communication state, such as described in connection with 926 of FIG. 9. For example, the scheduling component 1146 may determine content the UE 104 is to include in UCI, such as ACK/NACK feedback, SRs, or CSI. The scheduling component 1146 may determine which resources in the activated one of the set of supplementary BWPs are PUCCH resources and, in some aspects, whether sufficient PUCCH resources are available to carry multiplexed ACK/NACK feedback, SRs, and CSI or whether the UE 104 should drop CSI. The scheduling component 1146 may allocate, from among the available PUCCH resources, the set of PUCCH resources for UCI from the UE 104, for example, according to the content the UE 104 is to include in the UCI. The transmission component 1134 may generate a message to indicate the PUCCH resource allocation on which the UCI is scheduled, and the message may be transmitted to the UE 104.

The apparatus 1102 may include additional components that perform some or all of the blocks, operations, signaling, and so forth of the algorithms in the aforementioned call flow diagrams or flowcharts of FIG. 5 and FIG. 9. As such, some or all of the blocks, operations, signaling, and so forth in the aforementioned call flow diagrams or flowcharts of FIG. 5 and FIG. 9 may be performed by one or more components and the apparatus 1102 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, may include means for defining each of a first set of BWPs corresponding to a first communication state of a set of communication states for the network node; and means for outputting information identifying each of the first set of BWPs.

In one configuration, the apparatus 1102, and in particular the baseband unit 1104, may include means for scheduling communication with a UE on a set of resources in one of the first set of BWPs, the set of resources being associated with the first communication state of the set of communication states.

In one configuration, the apparatus 1102, and in particular the baseband unit 1104, may include means for activating the one of the first set of BWPs for the UE; and means for scheduling the communication with the UE on the one of the first set of BWPs when the one of the first set of BWPs is activated.

In one configuration, the means for scheduling the communication with the UE on the set of resources is configured to at least one of: schedule a set of CSI-RSs for the UE on the set of resources associated with the first communication state, schedule a set of SRSs from the UE on the set of resources associated with the first communication state, or schedule UCI from the UE on the set of resources associated with the first communication state and the set of resources includes a PUCCH.

In one configuration, the apparatus 1102, and in particular the baseband unit 1104, may include means for outputting information indicating at least one of a schedule of the set of CSI-RSs for the UE, a schedule of the set of SRSs from the UE, or a schedule of the UCI from the UE on the PUCCH.

In one configuration, the apparatus 1102, and in particular the baseband unit 1104, may include means for defining each of a second set of BWPs corresponding to a second communication state of the set of communication states, each of the first set of BWPs being locatable from a respective one of the second set of BWPs, and means for outputting information identifying each of the second set of BWPs.

In one configuration, each of the first set of BWPs is at least one of: offset from a center frequency of a respective one of the second set of BWPs, at least partially overlaps with a respective one of the second set of BWPs, or spans a smaller range than a respective one of the second set of BWPs.

In one configuration, the first communication state includes a first set of parameters that includes at least one of: a number of transmit antennas associated with the network node, a number of ports configured for CSI-RS, a resource allocation for a PUCCH, a number of repetitions for SRSs, or a number of repetitions for transmissions on the PUCCH.

In one configuration, at least one of the first set of parameters is inherited from a second set of parameters included in the second communication state of the set of communication states.

In one configuration, the apparatus 1102, and in particular the baseband unit 1104, may include means for defining a default BWP included within the second set of BWPs, the default BWP corresponding to the second communication state.

In one configuration, an indication of the default BWP is scheduled for transmission via at least one of: DCI, a transmission on dedicated resources of a PDSCH, a MAC CE, or an RRC signaling message.

In one configuration, the apparatus 1102, and in particular the baseband unit 1104, may include means for selecting the first communication state of the set of communication states, the selection of the first communication state being associated with at least one of an amount of traffic associated with the network node, a number of UEs connected with the network node, a type of traffic associated with the network node, or a priority of traffic associated with the network node.

In one configuration, the means for communicating with the UE on the set of resources is configured to at least one of: transmit a set of CSI-RSs to the UE on the set of resources associated with the first communication state, receive a set of SRSs from the UE on the set of resources associated with the first communication state, or receive UCI from the UE on the set of resources associated with the first communication state and the set of resources includes a PUCCH.

In one configuration, the apparatus 1102, and in particular the baseband unit 1104, may include means for transmitting an indication associated with configuring a second set of BWPs to the UE, each of the second set of BWPs corresponding to a second communication state of the set of communication states, and the one of the first set of BWPs is locatable from one of the second set of BWPs.

In one configuration, the one of the first set of BWPs is at least one of: offset from a center frequency of the one of the second set of BWPs, at least partially overlaps with the one of the second set of BWPs, or spans a smaller range than the one of the second set of BWPs.

In one configuration, the first communication state includes a first set of parameters that includes at least one of: a number of transmit antennas of the network node, a number of ports configured for CSI-RSs, a resource allocation for a PUCCH, a number of repetitions for SRSs, or a number of repetitions for transmissions on the PUCCH.

In one configuration, at least one of the first set of parameters is inherited from a second set of parameters included in the second communication state of the set of communication states.

In one configuration, the apparatus 1102, and in particular the baseband unit 1104, may include means for transmitting, to the UE, information indicating a default BWP included within the second set of BWPs, the default BWP corresponding to the second communication state.

In one configuration, the information indicating the default BWP is transmitted via at least one of: DCI, a transmission on dedicated resources of a PDSCH, a MAC CE, or an RRC signaling message.

In one configuration, the apparatus 1102, and in particular the baseband unit 1104, may include means for selecting the first communication state of the set of communication states for communication with the UE on the set of resources, the selecting of the first communication state being associated with at least one of an amount of traffic through the network node, a number of UEs connected with the network node, a type of traffic through the network node, or a priority of traffic through the network node.

In one configuration, the apparatus 1102, and in particular the baseband unit 1104, may include means for transmitting information activating the one of the first set of BWPs to the UE, and the means for communicating with the UE on the set of resources in the one of the first set of BWPs is configured to communicate with the UE on the one of the first set of BWPs when the one of the first set of BWPs is active.

The aforementioned means may be one or more of the aforementioned components of the apparatus 1102 configured to perform the functions recited by the aforementioned means. As described herein, the apparatus 1102 may include the TX Processor 416, the RX Processor 470, and the controller/processor 475. As such, in one configuration, the aforementioned means may be the TX Processor 416, the RX Processor 470, and the controller/processor 475 configured to perform the functions recited by the aforementioned means.

The specific order or hierarchy of blocks or operations in each of the foregoing processes, flowcharts, and other diagrams disclosed herein is an illustration of example approaches. Based upon design preferences, the specific order or hierarchy of blocks or operations in each the processes, flowcharts, and other diagrams may be rearranged, omitted, or contemporaneously performed without departing from the scope of the present disclosure. Further, some blocks may be combined or omitted. The accompanying method claims present elements of the various blocks in a sample order, and are not meant to be limited to the specific order or hierarchy presented.

The following examples are illustrative only and may be combined with aspects of other implementations, concepts, or various aspects described herein, without limitation.

Example 1 may be an apparatus for wireless communication at a UE, including: a first interface configured to obtain an indication associated with configuring a first set of BWPs from a network node, each of the first set of BWPs corresponding to a first communication state of a set of communication states for the network node; and a processing system configured to communicate with the network node on a set of resources in one of the first set of BWPs, the set of resources being associated with the first communication state of the set of communication states.

Example 2 may be the apparatus of Example 1, and to communicate with the network node on the set of resources, at least one of: the first interface is configured to obtain a set of CSI-RSs received on the set of resources associated with the first communication state, a second interface is configured to output a set of SRSs on the set of resources associated with the first communication state, or the second interface is configured to output UCI on the set of resources associated with the first communication state and the set of resources includes a PUCCH.

Example 3 may be the apparatus of Example 1, and the first interface is further configured to: obtain an indication associated with configuring a second set of BWPs from the network node, each of the second set of BWPs corresponding to a second communication state of the set of communication states; and the processing system is further configured to locate the one of the first set of BWPs from one of the second set of BWPs.

Example 4 may be the apparatus of Example 3, and the one of the first set of BWPs is at least one of: offset from a center frequency of the one of the second set of BWPs, at least partially overlaps with the one of the second set of BWPs, or spans a smaller range than the one of the second set of BWPs.

Example 5 may be the apparatus of Example 3, and the first communication state is associated with a first set of parameters that includes at least one of: a number of transmit antennas of the network node, a number of ports configured for CSI-RSs, a resource allocation for a PUCCH, a number of repetitions for SRSs, or a number of repetitions for transmissions on the PUCCH.

Example 6 may be the apparatus of Example 5, and at least one of the first set of parameters is inherited from a second set of parameters associated with the second communication state of the set of communication states corresponding to the one of the second set of BWPs.

Example 7 may be the apparatus of Example 3, and the processing system is further configured to: default to the second communication state, and the one of the second set of BWPs includes a default BWP.

Example 8 may be the apparatus of Example 7, and the first interface is further configured to: obtain information indicating the default BWP, the default BWP corresponding to the second communication state.

Example 9 may be the apparatus of Example 8, and the information indicating the default BWP is obtained via at least one of: DCI, a transmission on dedicated resources of a PDSCH, a MAC CE, or a RRC signaling message.

Example 10 may be the apparatus of Example 1, and the first interface is further configured to: obtain information activating the one of the first set of BWPs from the network node, and to communicate with the network node on the set of resources in the one of the first set of BWPs the processing system is configured to communicate in the one of the first set of BWPs when the one of the first set of BWPs is active.

Example 11 is an apparatus for wireless communication at a network node, including: a first interface configured to output an indication associated with configuring a first set of BWPs for transmission to a UE, each of the first set of BWPs corresponding to a first communication state of a set of communication states for the network node; and a processing system configured to communicate with the UE on a set of resources in one of the first set of BWPs, the set of resources being associated with the first communication state of the set of communication states.

Example 12 may be the apparatus of Example 11, and to communicate with the UE on the set of resources, at least one of: the first interface is configured to output a set of CSI-RSs for transmission to the UE on the set of resources associated with the first communication state, a second interface is configured to obtain a set of SRSs from the UE on the set of resources associated with the first communication state, or the second interface is configured to obtain UCI from the UE on the set of resources associated with the first communication state and the set of resources includes a PUCCH.

Example 13 may be the apparatus of Example 11, and the first interface is further configured to: output an indication associated with configuring a second set of BWPs for transmission to the UE, each of the second set of BWPs corresponding to a second communication state of the set of communication states, and the one of the first set of BWPs is locatable from one of the second set of BWPs.

Example 14 may be the apparatus of Example 13, and the one of the first set of BWPs is at least one of: offset from a center frequency of the one of the second set of BWPs, at least partially overlaps with the one of the second set of BWPs, or spans a smaller range than the one of the second set of BWPs.

Example 15 may be the apparatus of Example 13, and the first communication state includes a first set of parameters that includes at least one of: a number of transmit antennas of the network node, a number of ports configured for CSI-RS, a resource allocation for a PUCCH, a number of repetitions for SRSs, or a number of repetitions for transmissions on the PUCCH.

Example 16 may be the apparatus of Example 15, and at least one of the first set of parameters is inherited from a second set of parameters included in the second communication state of the set of communication states.

Example 17 may be the apparatus of Example 13, and the first interface is further configured to output information indicating a default BWP included within the second set of BWPs, the default BWP corresponding to the second communication state.

Example 18 may be the apparatus of Example 17, and the information indicating the default BWP is output for transmission via at least one of: DCI, a transmission on dedicated resources of a PDSCH, a MAC CE, or a RRC signaling message.

Example 19 may be the apparatus of Example 11, and the processing system is further configured to: select the first communication state of the set of communication states for communication with the UE on the set of resources, the selection of the first communication state being associated with at least one of an amount of traffic through the network node, a number of UEs connected with the network node, a type of traffic through the network node, or a priority of traffic through the network node.

Example 20 may be the apparatus of Example 11, and the first interface is further configured to: output information activating the one of the first set of BWPs for transmission to the UE, and to communicate with the UE on the set of resources in the one of the first set of BWPs, the processing system is configured to communicate with the UE on the one of the first set of BWPs when the one of the first set of BWPs is active.

Example 21 may be a method of wireless communication at a UE, including: receiving an indication associated with configuring a first set of BWPs from a network node, each of the first set of BWPs corresponding to a first communication state of a set of communication states for the network node; and communicating with the network node on a set of resources in one of the first set of BWPs, the set of resources being associated with the first communication state of the set of communication states.

Example 22 may be the method of Example 21, and the communicating with the network node on the set of resources includes at least one of: receiving a set of CSI-RSs from the network node on the set of resources associated with the first communication state, transmitting a set of SRSs on the set of resources associated with the first communication state, or transmitting UCI on the set of resources associated with the first communication state and the set of resources includes a PUCCH.

Example 23 may be the method of Example 21, further including: receiving an indication associated with configuring a second set of BWPs from the network node, each of the second set of BWPs corresponding to a second communication state of the set of communication states; and locating the one of the first set of BWPs from one of the second set of BWPs.

Example 24 may be the method of Example 23, and the one of the first set of BWPs is at least one of: offset from a center frequency of the one of the second set of BWPs, at least partially overlaps with the one of the second set of BWPs, or spans a smaller range than the one of the second set of BWPs.

Example 25 may be the method of Example 23, and the first communication state is associated with a first set of parameters that includes at least one of: a number of transmit antennas of the network node, a number of ports configured for CSI-RSs, a resource allocation for a PUCCH, a number of repetitions for SRSs, or a number of repetitions for transmissions on the PUCCH.

Example 26 may be the method of Example 25, and at least one of the first set of parameters is inherited from a second set of parameters associated with the second communication state of the set of communication states corresponding to the one of the second set of BWPs.

Example 27 may be the method of Example 23, further including: defaulting to the second communication state, and the one of the second set of BWPs includes a default BWP.

Example 28 may be the method of Example 27, further including: receiving information indicating the default BWP, the default BWP corresponding to the second communication state.

Example 29 may be the method of Example 28, and the information indicating the default BWP is received via at least one of: DCI, a transmission on dedicated resources of a PDSCH, a MAC CE, or a RRC signaling message.

Example 30 may be the method of Example 21, further including: receiving information activating the one of the first set of BWPs from the network node, and the communicating with the network node on the set of resources in the one of the first set of BWPs includes communicating in the one of the first set of BWPs when the one of the first set of BWPs is active.

Example 31 is a method of wireless communication at a network node, including: transmitting an indication associated with configuring a first set of BWPs to a UE, each of the first set of BWPs corresponding to a first communication state of a set of communication states for the network node; and communicating with the UE on a set of resources in one of the first set of BWPs, the set of resources being associated with the first communication state of the set of communication states.

Example 32 may be the method of Example 31, and the communicating with the UE on the set of resources includes at least one of: transmitting a set of CSI-RSs to the UE on the set of resources associated with the first communication state, receiving a set of SRSs from the UE on the set of resources associated with the first communication state, or receiving UCI from the UE on the set of resources associated with the first communication state and the set of resources includes a PUCCH.

Example 33 may be the method of Example 31, further including: transmitting an indication associated with configuring a second set of BWPs to the UE, each of the second set of BWPs corresponding to a second communication state of the set of communication states, and the one of the first set of BWPs is locatable from one of the second set of BWPs.

Example 34 may be the method of Example 33, and the one of the first set of BWPs is at least one of: offset from a center frequency of the one of the second set of BWPs, at least partially overlaps with the one of the second set of BWPs, or spans a smaller range than the one of the second set of BWPs.

Example 35 may be the method of Example 33, and the first communication state includes a first set of parameters that includes at least one of: a number of transmit antennas of the network node, a number of ports configured for CSI-RS, a resource allocation for a PUCCH, a number of repetitions for SRSs, or a number of repetitions for transmissions on the PUCCH.

Example 36 may be the method of Example 35, and at least one of the first set of parameters is inherited from a second set of parameters included in the second communication state of the set of communication states.

Example 37 may be the method of Example 33, further including: transmitting, to the UE, information indicating a default BWP included within the second set of BWPs, the default BWP corresponding to the second communication state.

Example 38 may be the method of Example 37, and the information indicating the default BWP is transmitted via at least one of: DCI, a transmission on dedicated resources of a PDSCH, a MAC CE, or a RRC signaling message.

Example 39 may be the method of Example 31, further including: selecting the first communication state of the set of communication states for communication with the UE on the set of resources, the selecting of the first communication state being associated with at least one of an amount of traffic through the network node, a number of UEs connected with the network node, a type of traffic through the network node, or a priority of traffic through the network node.

Example 40 may be the method of Example 31, further including: transmitting information activating the one of the first set of BWPs to the UE, and the communicating with the UE on the set of resources in the one of the first set of BWPs includes communicating with the UE on the one of the first set of BWPs when the one of the first set of BWPs is active.

Example 41 is an apparatus for wireless communication at a UE, including: means for receiving an indication associated with configuring a first set of BWPs from a network node, each of the first set of BWPs corresponding to a first communication state of a set of communication states for the network node; and means for communicating with the network node on a set of resources in one of the first set of BWPs, the set of resources being associated with the first communication state of the set of communication states.

Example 42 may be the apparatus of Example 41, and the means for communicating with the network node on the set of resources is configured to at least one of: receive a set of CSI-RSs from the network node on the set of resources associated with the first communication state,
transmit a set of SRSs on the set of resources associated with the first communication state, or transmit UCI on the set of resources associated with the first communication state and the set of resources includes a PUCCH.

Example 43 may be the apparatus of Example 41, further including: means for receiving an indication associated with configuring a second set of BWPs from the network node, each of the second set of BWPs corresponding to a second communication state of the set of communication states; and means for locating the one of the first set of BWPs from one of the second set of BWPs.

Example 44 may be the apparatus of Example 43, and the one of the first set of BWPs is at least one of: offset from a center frequency of the one of the second set of BWPs, at least partially overlaps with the one of the second set of BWPs, or spans a smaller range than the one of the second set of BWPs.

Example 45 may be the apparatus of Example 43, and the first communication state is associated with a first set of parameters that includes at least one of: a number of transmit antennas of the network node, a number of ports configured for CSI-RSs, a resource allocation for a PUCCH, a number of repetitions for SRSs, or a number of repetitions for transmissions on the PUCCH.

Example 46 may be the apparatus of Example 45, and at least one of the first set of parameters is inherited from a second set of parameters associated with the second communication state of the set of communication states corresponding to the one of the second set of BWPs.

Example 47 may be the apparatus of Example 43, further including: means for defaulting to the second communication state, and the one of the second set of BWPs includes a default BWP.

Example 48 may be the apparatus of Example 47, further including: means for receiving information indicating the default BWP, the default BWP corresponding to the second communication state.

Example 49 may be the apparatus of Example 48, and the information indicating the default BWP is received via at least one of: DCI, a transmission on dedicated resources of a PDSCH, a MAC CE, or a RRC signaling message.

Example 50 may be the apparatus of Example 41, further including: means for receiving information activating the one of the first set of BWPs from the network node, and the means for communicating with the network node on the set of resources in the one of the first set of BWPs is configured to communicate in the one of the first set of BWPs when the one of the first set of BWPs is active.

Example 51 is an apparatus for wireless communication at a network node, including: means for transmitting an indication associated with configuring a first set of BWPs to a UE, each of the first set of BWPs corresponding to a first communication state of a set of communication states for the network node; and means for communicating with the UE on a set of resources in one of the first set of BWPs, the set of resources being associated with the first communication state of the set of communication states.

Example 52 may be the apparatus of Example 51, and the means for communicating with the UE on the set of resources includes at least one of: transmitting a set of CSI-RSs to the UE on the set of resources associated with the first communication state, receiving a set of SRSs from the UE on the set of resources associated with the first communication state, or receiving UCI from the UE on the set of resources associated with the first communication state and the set of resources includes a PUCCH.

Example 53 may be the apparatus of Example 51, further including: means for transmitting an indication associated with configuring a second set of BWPs to the UE, each of the second set of BWPs corresponding to a second communication state of the set of communication states, and the one of the first set of BWPs is locatable from one of the second set of BWPs.

Example 54 may be the apparatus of Example 53, and the one of the first set of BWPs is at least one of: offset from a center frequency of the one of the second set of BWPs, at least partially overlaps with the one of the second set of BWPs, or spans a smaller range than the one of the second set of BWPs.

Example 55 may be the apparatus of Example 53, and the first communication state includes a first set of parameters that includes at least one of: a number of transmit antennas of the network node, a number of ports configured for CSI-RS, a resource allocation for a PUCCH, a number of repetitions for SRSs, or a number of repetitions for transmissions on the PUCCH.

Example 56 may be the apparatus of Example 55, and at least one of the first set of parameters is inherited from a second set of parameters included in the second communication state of the set of communication states.

Example 57 may be the apparatus of Example 53, further including: means for transmitting, to the UE, information indicating a default BWP included within the second set of BWPs, the default BWP corresponding to the second communication state.

Example 58 may be the apparatus of Example 57, and the information indicating the default BWP is transmitted via at least one of: DCI, a transmission on dedicated resources of a PDSCH, a MAC CE, or a RRC signaling message.

Example 59 may be the apparatus of Example 51, further including: means for selecting the first communication state of the set of communication states for communication with the UE on the set of resources, the selecting of the first communication state being associated with at least one of an amount of traffic through the network node, a number of UEs connected with the network node, a type of traffic through the network node, or a priority of traffic through the network node.

Example 60 may be the apparatus of Example 51, further including: means for transmitting information activating the one of the first set of BWPs to the UE, and the means for communicating with the UE on the set of resources in the one of the first set of BWPs is configured to communicate with the UE on the one of the first set of BWPs when the one of the first set of BWPs is active.

Example 61 is a computer-readable medium storing computer-executable code for wireless communication at a UE, the code when executed by a processor cause the processor to: receive an indication associated with configuring a first set of BWPs from a network node, each of the first set of BWPs corresponding to a first communication state of a set of communication states for the network node; and communicate with the network node on a set of resources in one of the first set of BWPs, the set of resources being associated with the first communication state of the set of communication states.

Example 62 is a computer-readable medium storing computer-executable code for wireless communication at a network node, the code when executed by a processor cause the processor to: transmit an indication associated with configuring a first set of BWPs to a UE, each of the first set of BWPs corresponding to a first communication state of a set of communication states for the network node; and communicate with the UE on a set of resources in one of the first set of BWPs, the set of resources being associated with the first communication state of the set of communication states.

Example 63 is an apparatus for wireless communication at a network node, including: a processing system configured to define each of a first set of BWPs corresponding to a first communication state of a set of communication states for the network node; and a first interface configured to output information identifying each of the first set of BWPs.

Example 64 may be the apparatus of Example 63, and the processing system is further configured to schedule communication with a UE on a set of resources in one of the first set of BWPs, the set of resources being associated with the first communication state of the set of communication states.

Example 65 may be the apparatus of Example 64, and the processing system is further configured to: activate the one of the first set of BWPs for the UE; and schedule the communication with the UE on the one of the first set of BWPs when the one of the first set of BWPs is activated.

Example 66 may be the apparatus of Example 64, and to schedule the communication with the UE on the set of resources, the processing system is further configured to at least one of: schedule a set of CSI-RSs for the UE on the set of resources associated with the first communication state, schedule a set of SRSs from the UE on the set of resources associated with the first communication state, or schedule UCI from the UE on the set of resources associated with the first communication state and the set of resources includes a PUCCH.

Example 67 may be the apparatus of Example 66, and the first interface is further configured to output information indicating at least one of the schedule of the set of CSI-RSs for the UE, the schedule of the set of SRSs from the UE, or the schedule of the UCI from the UE on the PUCCH.

Example 68 may be the apparatus of Example 63, and the processing system is further configured to define each of a second set of BWPs corresponding to a second communication state of the set of communication states, where each of the first set of BWPs is locatable from a respective one of the second set of BWPs, and the first interface is further configured to output information identifying each of the second set of BWPs.

Example 69 may be the apparatus of Example 68, where each of the first set of BWPs is at least one of: offset from a center frequency of a respective one of the second set of BWPs, at least partially overlaps with a respective one of the second set of BWPs, or spans a smaller range than a respective one of the second set of BWPs.

Example 70 may be the apparatus of Example 68, and the first communication state includes a first set of parameters that includes at least one of: a number of transmit antennas associated with the network node, a number of ports configured for CSI-RS, a resource allocation for a PUCCH, a number of repetitions for SRSs, or a number of repetitions for transmissions on the PUCCH.

Example 71 may be the apparatus of Example 70, and at least one of the first set of parameters is inherited from a second set of parameters included in the second communication state of the set of communication states.

Example 72 may be the apparatus of Example 68, and the processing system is further configured to define a default BWP included within the second set of BWPs, the default BWP corresponding to the second communication state.

Example 73 may be the apparatus of Example 72, and an indication of the default BWP is scheduled for transmission via at least one of: DCI, a transmission on dedicated resources of a PDSCH, a MAC CE, or an RRC signaling message.

Example 74 may be the apparatus of Example 63, and the processing system is further configured to select the first communication state of the set of communication states, the selection of the first communication state being associated with at least one of an amount of traffic associated with the network node, a number of UEs connected with the network node, a type of traffic associated with the network node, or a priority of traffic associated with the network node.

Example 75 is a method wireless communication at a network node, including: defining each of a first set of BWPs corresponding to a first communication state of a set of communication states for the network node; and outputting information identifying each of the first set of BWPs.

Example 76 may be the method of Example 75, and further including scheduling communication with a UE on a set of resources in one of the first set of BWPs, the set of resources being associated with the first communication state of the set of communication states.

Example 77 may be the method of Example 76, and further including activating the one of the first set of BWPs for the UE; and scheduling the communication with the UE on the one of the first set of BWPs when the one of the first set of BWPs is activated.

Example 78 may be the method of Example 76, and scheduling the communication with the UE on the set of resources includes at least one of: scheduling a set of CSI-RSs for the UE on the set of resources associated with the first communication state, scheduling a set of SRSs from the UE on the set of resources associated with the first communication state, or scheduling UCI from the UE on the set of resources associated with the first communication state and the set of resources includes a PUCCH.

Example 79 may be the method of Example 78, and further including outputting information indicating at least one of a schedule of the set of CSI-RSs for the UE, a schedule of the set of SRSs from the UE, or a schedule of the UCI from the UE on the PUCCH.

Example 80 may be the method of Example 75, and further including defining each of a second set of BWPs corresponding to a second communication state of the set of communication states, each of the first set of BWPs being locatable from a respective one of the second set of BWPs, and outputting information identifying each of the second set of BWPs.

Example 81 may be the method of Example 80, and each of the first set of BWPs is at least one of: offset from a center frequency of a respective one of the second set of BWPs, at least partially overlaps with a respective one of the second set of BWPs, or spans a smaller range than a respective one of the second set of BWPs.

Example 82 may be the method of Example 80, and the first communication state includes a first set of parameters that includes at least one of: a number of transmit antennas associated with the network node, a number of ports configured for CSI-RS, a resource allocation for a PUCCH, a number of repetitions for SRSs, or a number of repetitions for transmissions on the PUCCH.

Example 83 may be the method of Example 82, and at least one of the first set of parameters is inherited from a second set of parameters included in the second communication state of the set of communication states.

Example 84 may be the method of Example 80, and further including defining a default BWP included within the second set of BWPs, the default BWP corresponding to the second communication state.

Example 85 may be the method of Example 84, and an indication of the default BWP is scheduled for transmission via at least one of: DCI, a transmission on dedicated resources of a PDSCH, a MAC CE, or an RRC signaling message.

Example 86 may be the method of Example 75, and further including selecting the first communication state of the set of communication states, the selection of the first communication state being associated with at least one of an amount of traffic associated with the network node, a number of UEs connected with the network node, a type of traffic associated with the network node, or a priority of traffic associated with the network node.

Example 87 is an apparatus for wireless communication at a network node, including: means for defining each of a first set of BWPs corresponding to a first communication state of a set of communication states for the network node; and means for outputting information identifying each of the first set of BWPs.

Example 88 may be the apparatus of Example 87, and further including means for scheduling communication with a UE on a set of resources in one of the first set of BWPs, the set of resources being associated with the first communication state of the set of communication states.

Example 89 may be the apparatus of Example 88, and further including means for activating the one of the first set of BWPs for the UE; and means for scheduling the communication with the UE on the one of the first set of BWPs when the one of the first set of BWPs is activated.

Example 90 may be the apparatus of Example 88, and the means for scheduling the communication with the UE on the set of resources is configured to at least one of: schedule a set of CSI-RSs for the UE on the set of resources associated with the first communication state, schedule a set of SRSs from the UE on the set of resources associated with the first communication state, or schedule UCI from the UE on the set of resources associated with the first communication state and the set of resources includes a PUCCH.

Example 91 may be the apparatus of Example 90, and further including means for outputting information indicating at least one of a schedule of the set of CSI-RSs for the UE, a schedule of the set of SRSs from the UE, or a schedule of the UCI from the UE on the PUCCH.

Example 92 may be the apparatus of Example 87, and further including means for defining each of a second set of BWPs corresponding to a second communication state of the set of communication states, each of the first set of BWPs being locatable from a respective one of the second set of BWPs, and means for outputting information identifying each of the second set of BWPs.

Example 93 may be the apparatus of Example 92, and each of the first set of BWPs is at least one of: offset from a center frequency of a respective one of the second set of BWPs, at least partially overlaps with a respective one of the second set of BWPs, or spans a smaller range than a respective one of the second set of BWPs.

Example 94 may be the apparatus of Example 92, and the first communication state includes a first set of parameters that includes at least one of: a number of transmit antennas associated with the network node, a number of ports configured for CSI-RS, a resource allocation for a PUCCH, a number of repetitions for SRSs, or a number of repetitions for transmissions on the PUCCH.

Example 95 may be the apparatus of Example 94, and at least one of the first set of parameters is inherited from a second set of parameters included in the second communication state of the set of communication states.

Example 96 may be the apparatus of Example 92, and further including means for defining a default BWP included within the second set of BWPs, the default BWP corresponding to the second communication state.

Example 97 may be the apparatus of Example 96, and an indication of the default BWP is scheduled for transmission via at least one of: DCI, a transmission on dedicated resources of a PDSCH, a MAC CE, or an RRC signaling message.

Example 98 may be the apparatus of Example 87, and further including means for selecting the first communication state of the set of communication states, the selection of the first communication state being associated with at least one of an amount of traffic associated with the network node, a number of UEs connected with the network node, a type of traffic associated with the network node, or a priority of traffic associated with the network node.

Example 99 is a computer-readable medium storing computer-executable code for wireless communication at a network node, the code when executed by a processor cause the processor to: define each of a first set of BWPs corresponding to a first communication state of a set of communication states for the network node; and output information identifying each of the first set of BWPs.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, reduced instruction set computing (RISC) processor, graphics processing unit (GPU), or any other conventional processor, controller, microcontroller, or state machine. A processor also may be implemented as a combination of computing devices, such as a combination of a DSP and a microprocessor, a plurality of microprocessors, one or more microprocessors in conjunction with a DSP core, a system on a chip (SoC), or any other such configuration. In some implementations, particular processes and methods may be performed by a chip, integrated circuit, or other circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as by one or more modules of computer program instructions, encoded on a computer storage media for execution by, or to control the operation of, data processing apparatus.

If implemented in software, the functions may be stored on or transmitted over as one or more instructions or code on a computer-readable medium. In the context of the present disclosure, software shall be construed broadly to mean instructions, instruction sets, computer-executable code, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to a person having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication at a user equipment (UE), comprising:
a first interface configured to:
obtain an indication associated with configuring a first set of bandwidth parts (BWPs) from a network node, each of the first set of BWPs corresponding to a first communication state of a set of communication states for the network node and an indication associated with configuring a second set of BWPs from the network node, each of the second set of BWPs corresponding to a second communication state of the set of communication states; and
a processing system configured to:
locate the one of the first set of BWPs from one of the second set of BWPs; and
communicate with the network node on a set of resources in one of the first set of BWPs, the set of resources being associated with the first communication state of the set of communication states.

2. The apparatus of claim 1, wherein to communicate with the network node on the set of resources, at least one of:
the first interface is configured to obtain a set of channel state information (CSI) reference signals (RSs) (CSI-RSs) carried on the set of resources associated with the first communication state,
a second interface is configured to output a set of sounding reference signals (SRSs) on the set of resources associated with the first communication state, or
the second interface is configured to output uplink control information (UCI) on the set of resources associated with the first communication state and the set of resources includes a physical uplink control channel (PUCCH).

3. The apparatus of claim 1, wherein the one of the first set of BWPs is at least one of:
offset from a center frequency of the one of the second set of BWPs,
at least partially overlaps with the one of the second set of BWPs, or
spans a smaller range than the one of the second set of BWPs.

4. The apparatus of claim 1, wherein the first communication state is associated with a first set of parameters that comprises at least one of:
a number of transmit antennas of the network node,
a number of ports configured for channel state information (CSI) reference signals (RSs) (CSI-RSs),
a resource allocation for a physical uplink control channel (PUCCH),
a number of repetitions for sounding reference signals (SRSs), or
a number of repetitions for transmissions on the PUCCH.

5. The apparatus of claim 4, wherein at least one of the first set of parameters is inherited from a second set of parameters associated with the second communication state of the set of communication states corresponding to the one of the second set of BWPs.

6. The apparatus of claim 1, wherein the processing system is further configured to:
default to the second communication state, wherein the one of the second set of BWPs comprises a default BWP.

7. The apparatus of claim 6, wherein the first interface is further configured to:
obtain information indicating the default BWP, the default BWP corresponding to the second communication state.

8. The apparatus of claim 7, wherein the information indicating the default BWP is obtained via at least one of:
downlink control information (DCI),
a transmission on dedicated resources of a physical downlink shared channel (PDSCH),
a media access control (MAC) control element (CE), or
a radio resource control (RRC) signaling message.

9. The apparatus of claim 1, wherein the first interface is further configured to:
obtain information activating the one of the first set of BWPs from the network node, wherein to communicate with the network node on the set of resources in the one of the first set of BWPs the processing system is configured to communicate in the one of the first set of BWPs when the one of the first set of BWPs is active.

10. An apparatus for wireless communication at a network node, comprising:
a processing system configured to:
define each of a first set of bandwidth parts (BWPs) corresponding to a first communication state of a set of communication states for the network node and each of a second set of BWPs corresponding to a second communication state of the set of communication states, wherein each of the first set of BWPs is locatable from a respective one of the second set of BWPs, and
a first interface configured to output information identifying each of the first set of BWPs and information identifying each of the second set of BWPs.

11. The apparatus of claim 10, wherein the processing system is further configured to:
schedule communication with a user equipment (UE) on a set of resources in one of the first set of BWPs, the set of resources being associated with the first communication state of the set of communication states.

12. The apparatus of claim 11, wherein the processing system is further configured to:
activate the one of the first set of BWPs for the UE; and
schedule the communication with the UE on the one of the first set of BWPs when the one of the first set of BWPs is activated.

13. The apparatus of claim 11, wherein to schedule the communication with the UE on the set of resources, the processing system is further configured to at least one of:
schedule a set of channel state information (CSI) reference signals (RSs) (CSI-RSs) for the UE on the set of resources associated with the first communication state,
schedule a set of sounding reference signals (SRSs) from the UE on the set of resources associated with the first communication state, or
schedule uplink control information (UCI) from the UE on the set of resources associated with the first communication state and the set of resources includes a physical uplink control channel (PUCCH).

14. The apparatus of claim 13, wherein the first interface is further configured to output information indicating at least one of the schedule of the set of CSI-RSs for the UE, the schedule of the set of SRSs from the UE, or the schedule of the UCI from the UE on the PUCCH.

15. The apparatus of claim 10, wherein each of the first set of BWPs is at least one of:

offset from a center frequency of a respective one of the second set of BWPs, at least partially overlaps with a respective one of the second set of BWPs, or spans a smaller range than a respective one of the second set of BWPs.

16. The apparatus of claim 10, wherein the first communication state includes a first set of parameters that comprises at least one of:
   a number of transmit antennas associated with the network node,
   a number of ports configured for channel state information (CSI) reference signals (RS) (CSI-RS),
   a resource allocation for a physical uplink control channel (PUCCH),
   a number of repetitions for sounding reference signals (SRSs), or
   a number of repetitions for transmissions on the PUCCH.

17. The apparatus of claim 16, wherein at least one of the first set of parameters is inherited from a second set of parameters included in the second communication state of the set of communication states.

18. The apparatus of claim 10, wherein the processing system is further configured to define a default BWP included within the second set of BWPs, the default BWP corresponding to the second communication state.

19. The apparatus of claim 18, wherein an indication of the default BWP is scheduled for transmission via at least one of:
   downlink control information (DCI),
   a transmission on dedicated resources of a physical downlink shared channel (PDSCH),
   a media access control (MAC) control element (CE), or
   a radio resource control (RRC) signaling message.

20. The apparatus of claim 10, wherein the processing system is further configured to:
   select the first communication state of the set of communication states, the selection of the first communication state being associated with at least one of an amount of traffic associated with the network node, a number of UEs connected with the network node, a type of traffic associated with the network node, or a priority of traffic associated with the network node.

21. A method of wireless communication at a user equipment (UE), comprising:
   receiving an indication associated with configuring a first set of bandwidth parts (BWPs) from a network node, each of the first set of BWPs corresponding to a first communication state of a set of communication states for the network node and an indication associated with configuring a second set of BWPs from the network node, each of the second set of BWPs corresponding to a second communication state of the set of communication states;
   locating the one of the first set of BWPs from one of the second set of BWPs; and
   communicating with the network node on a set of resources in one of the first set of BWPs, the set of resources being associated with the first communication state of the set of communication states.

22. The method of claim 21, wherein the communicating with the network node on the set of resources comprises at least one of:
   receiving a set of channel state information (CSI) reference signals (RSs) (CSI-RSs) from the network node on the set of resources associated with the first communication state,
   transmitting a set of sounding reference signals (SRSs) on the set of resources associated with the first communication state, or
   transmitting uplink control information (UCI) on the set of resources associated with the first communication state and the set of resources includes a physical uplink control channel (PUCCH).

23. The method of claim 21, wherein the one of the first set of BWPs is at least one of:
   offset from a center frequency of the one of the second set of BWPs,
   at least partially overlaps with the one of the second set of BWPs, or
   spans a smaller range than the one of the second set of BWPs.

24. A method of wireless communication at a network node, comprising:
   defining each of a first set of bandwidth parts (BWPs) corresponding to a first communication state of a set of communication states for the network node and each of a second set of BWPs corresponding to a second communication state of the set of communication states, wherein each of the first set of BWPs is locatable from a respective one of the second set of BWPs; and
   outputting information identifying each of the first set of BWPs and information identifying each of the second set of BWPs.

25. The method of claim 24, further comprising:
   scheduling communication with a user equipment (UE) on a set of resources in one of the first set of BWPs, the set of resources being associated with the first communication state of the set of communication states.

26. The method of claim 25, wherein scheduling the communication with the UE on the set of resources in one of the first set of BWPs comprises at least one of:
   scheduling a set of channel state information (CSI) reference signals (RSs) (CSI-RSs) for the UE on the set of resources associated with the first communication state,
   scheduling a set of sounding reference signals (SRSs) from the UE on the set of resources associated with the first communication state, or
   scheduling uplink control information (UCI) from the UE on the set of resources associated with the first communication state and the set of resources includes a physical uplink control channel (PUCCH).

* * * * *